United States Patent
Tokunaga et al.

(10) Patent No.: US 8,082,375 B2
(45) Date of Patent: Dec. 20, 2011

(54) NOISE-TOLERANT DATA COMMUNICATION SYSTEM

(75) Inventors: Tetsuya Tokunaga, Gunma (JP); Yoshiyuki Yamagata, Gunma (JP); Yasuo Osawa, Gunma (JP); Kensuke Goto, Tochigi (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 307 days.

(21) Appl. No.: 12/186,149

(22) Filed: Aug. 5, 2008

(65) Prior Publication Data

US 2009/0043929 A1 Feb. 12, 2009

(30) Foreign Application Priority Data

Aug. 6, 2007 (JP) ................. 2007-204082

(51) Int. Cl.
  *G06F 3/00* (2006.01)
  *G06F 1/12* (2006.01)
(52) U.S. Cl. .......................... 710/61; 713/400
(58) Field of Classification Search ........... 710/61; 713/400
See application file for complete search history.

(56) References Cited

U.S. PATENT DOCUMENTS

| | | | |
|---|---|---|---|
| 2002/0054684 A1 * | 5/2002 | Menzl | 381/23.1 |
| 2002/0105842 A1 * | 8/2002 | Uchida et al. | 365/205 |
| 2005/0245218 A1 * | 11/2005 | Jayaramen | 455/192.3 |
| 2006/0277426 A1 * | 12/2006 | Lindorfer et al. | 713/400 |

FOREIGN PATENT DOCUMENTS

| | | |
|---|---|---|
| JP | 9-238150 | 9/1997 |
| JP | 9-238151 | 9/1997 |

* cited by examiner

*Primary Examiner* — Henry Tsai
*Assistant Examiner* — Hyun Nam
(74) *Attorney, Agent, or Firm* — Morrison & Foerster LLP

(57) ABSTRACT

This invention offers a data communication system that can perform data communication and detection of a data read-in request signal while reducing the number of communication lines to three, and is tolerant of noise. The data communication between a microcomputer and a key scan IC and the detection of the data read-in request signal are performed through a control line, a clock line and a data line. The data communication system is provided with a data line control circuit that controls the data line so that outputting of the data read-in signal RDRQ to the data line is disabled when first command data is inputted to the key scan IC through the data line, and that the outputting of the data read-in request signal RDRQ to the data line is enabled when second command data is inputted from the microcomputer to the key scan IC through the data line.

20 Claims, 37 Drawing Sheets

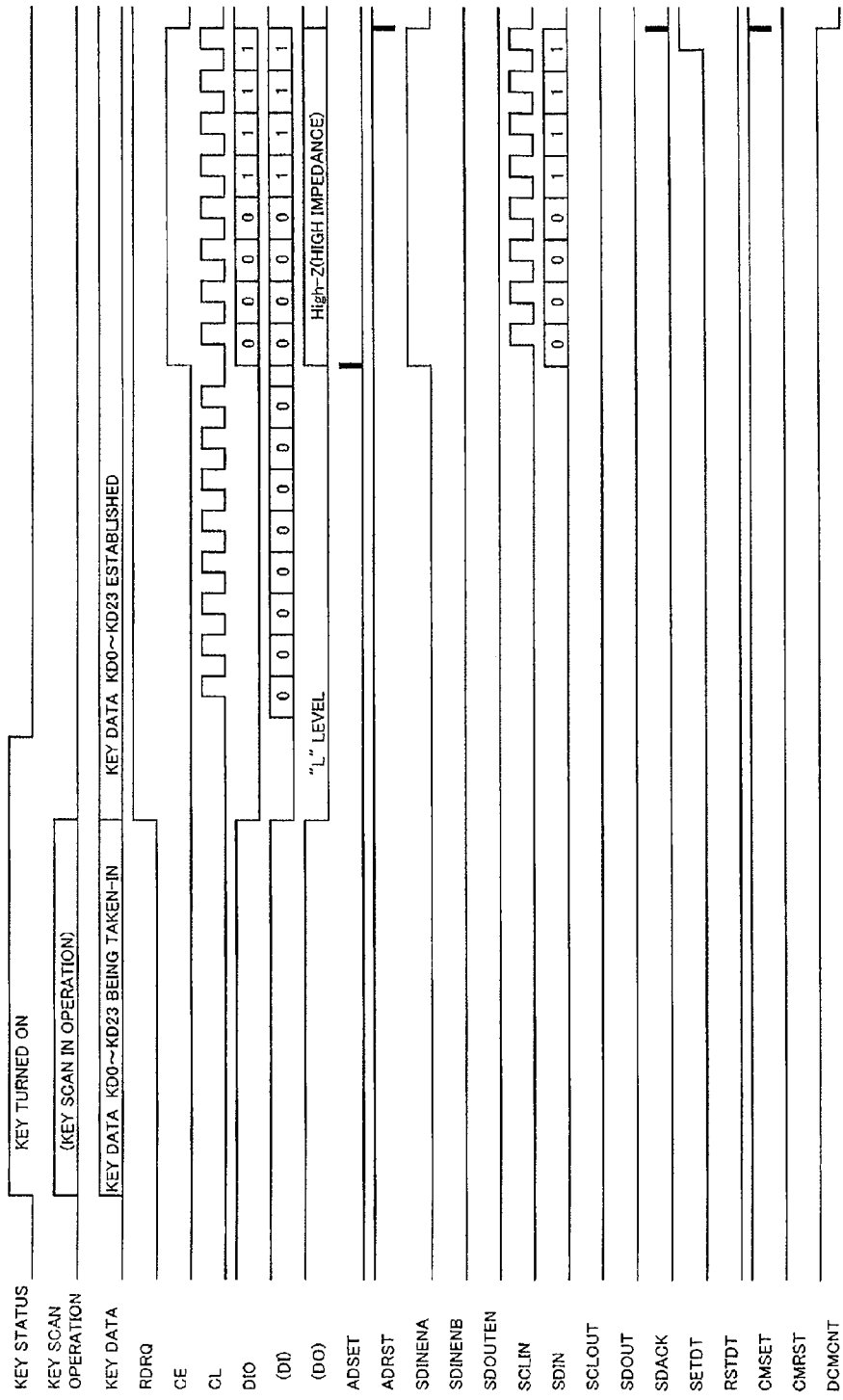

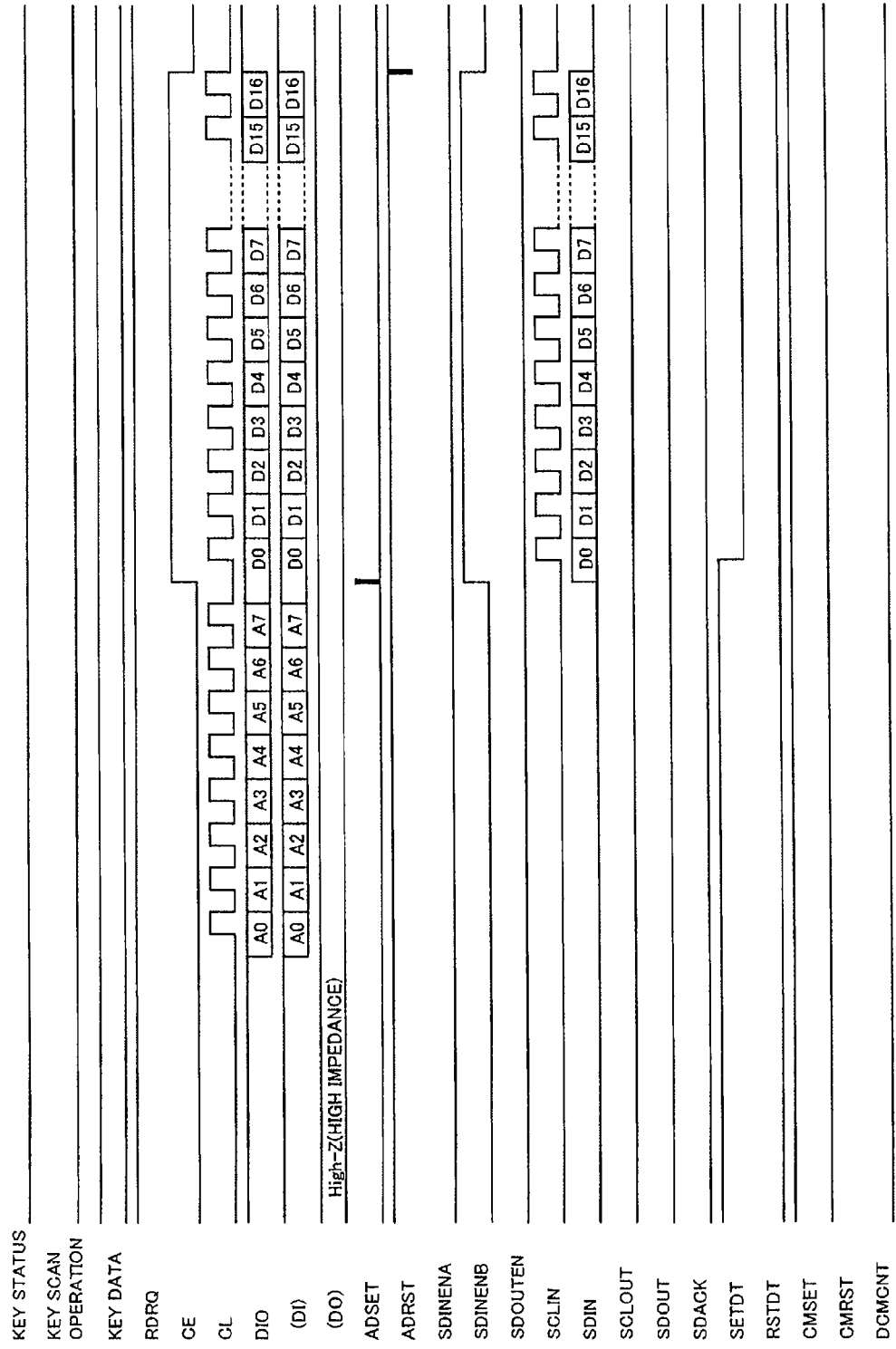

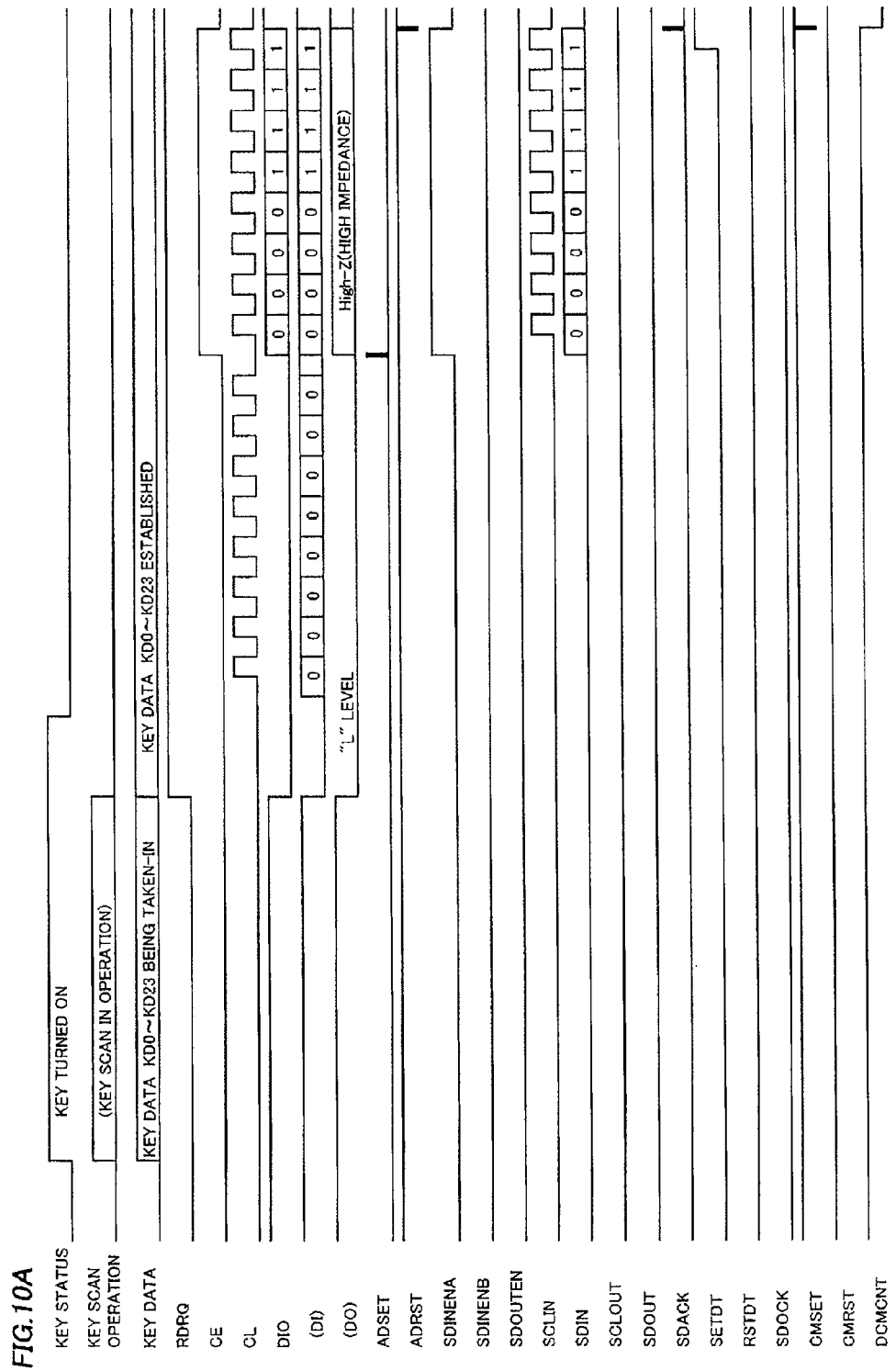

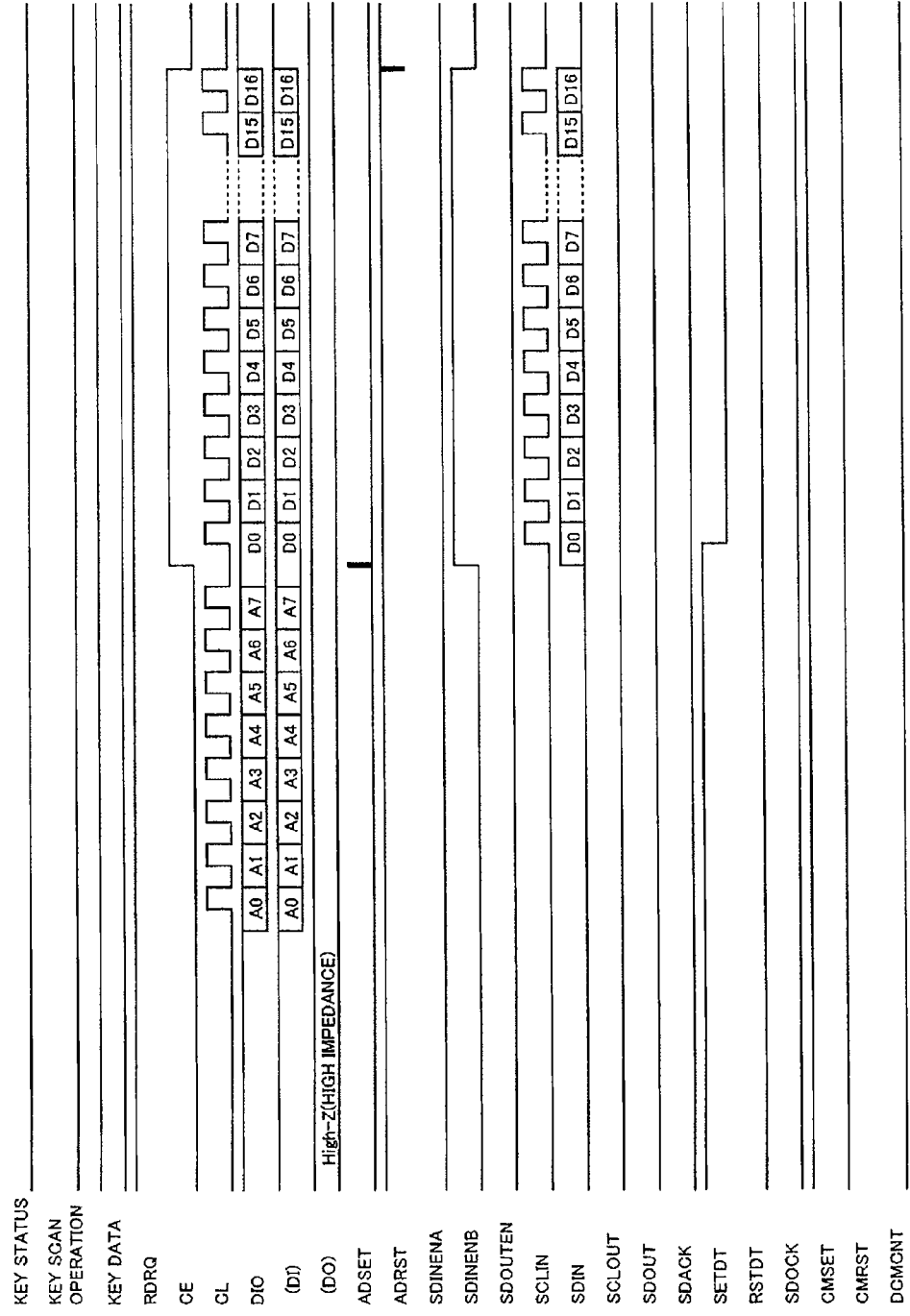

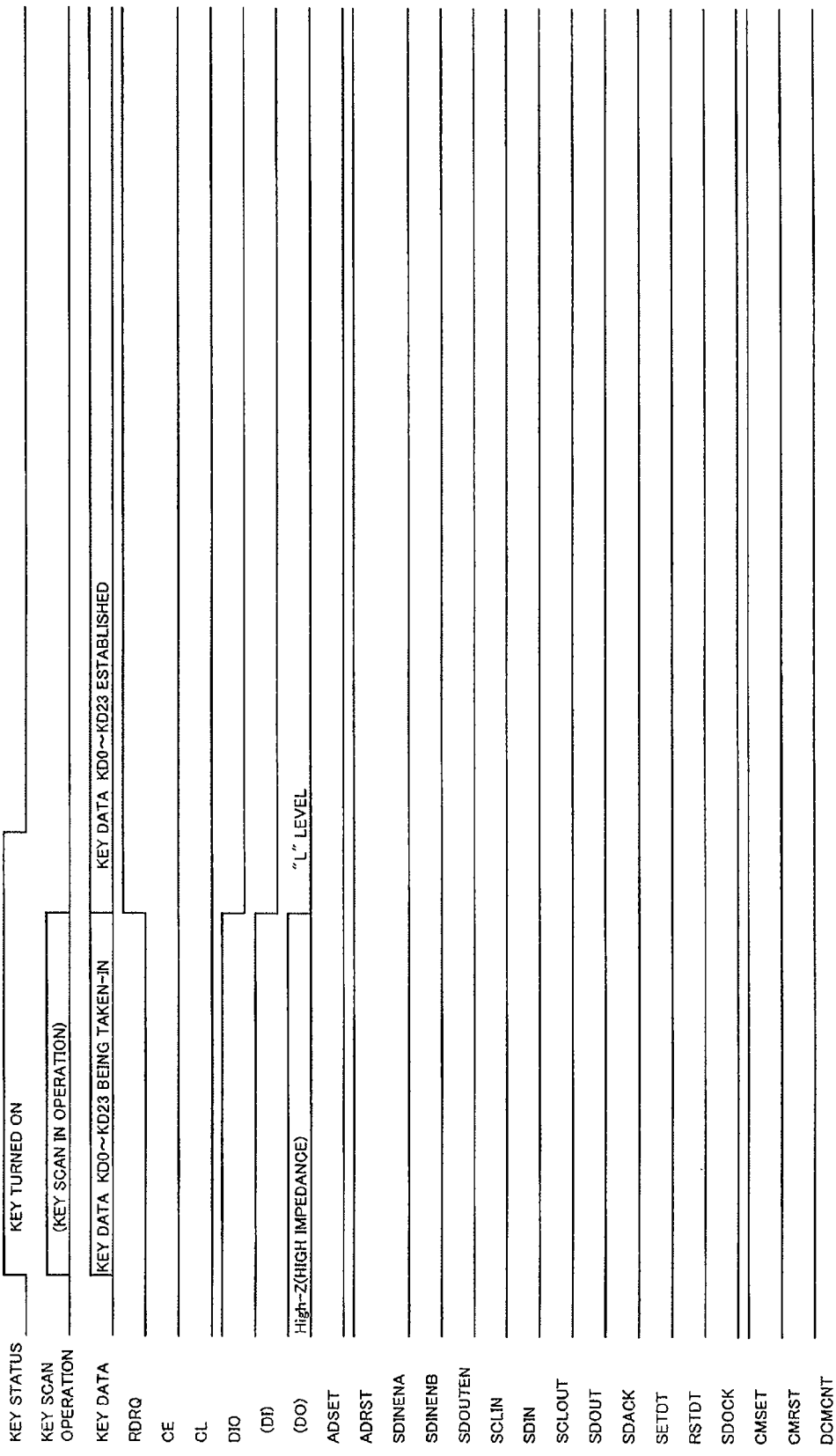

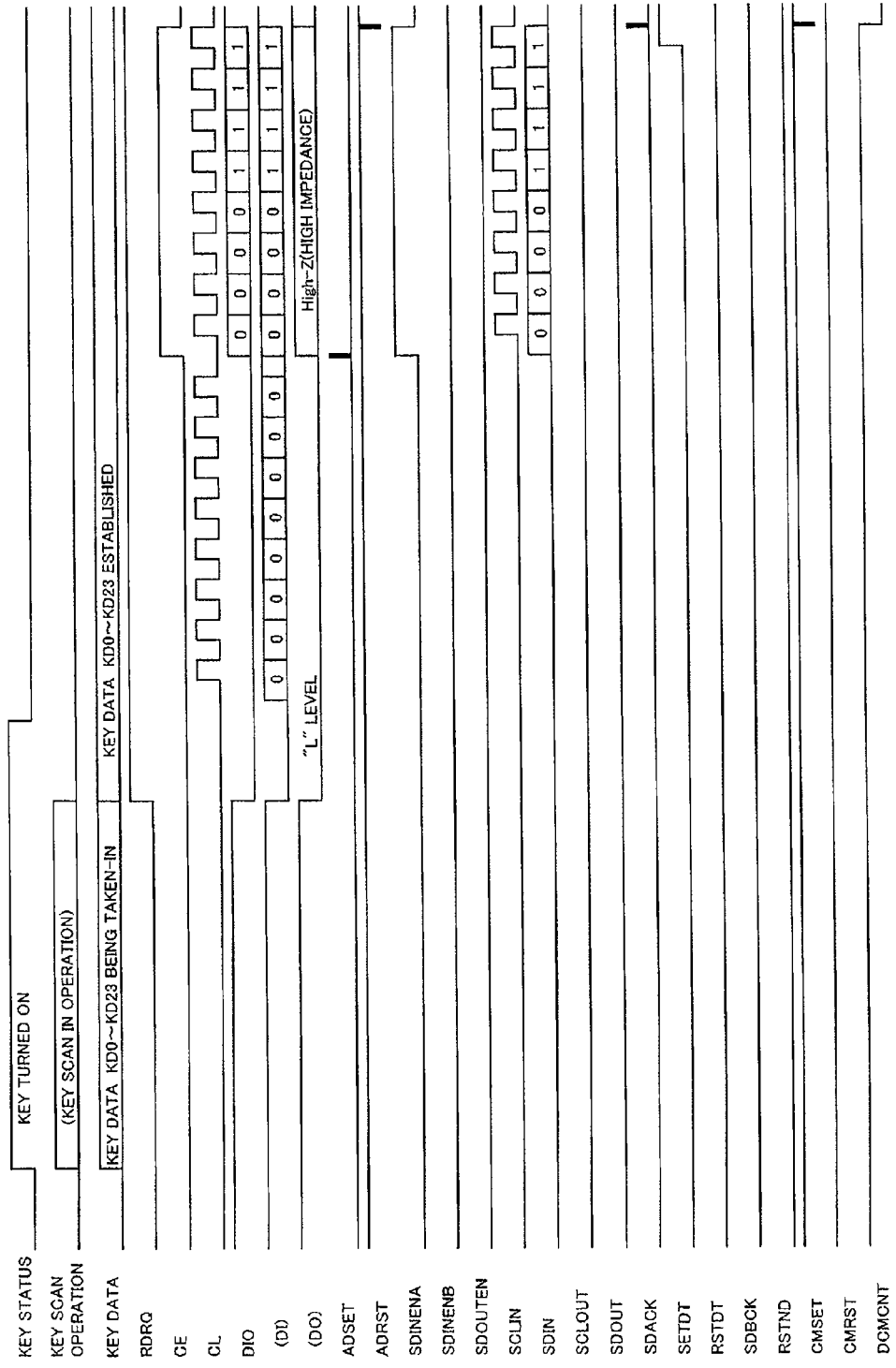

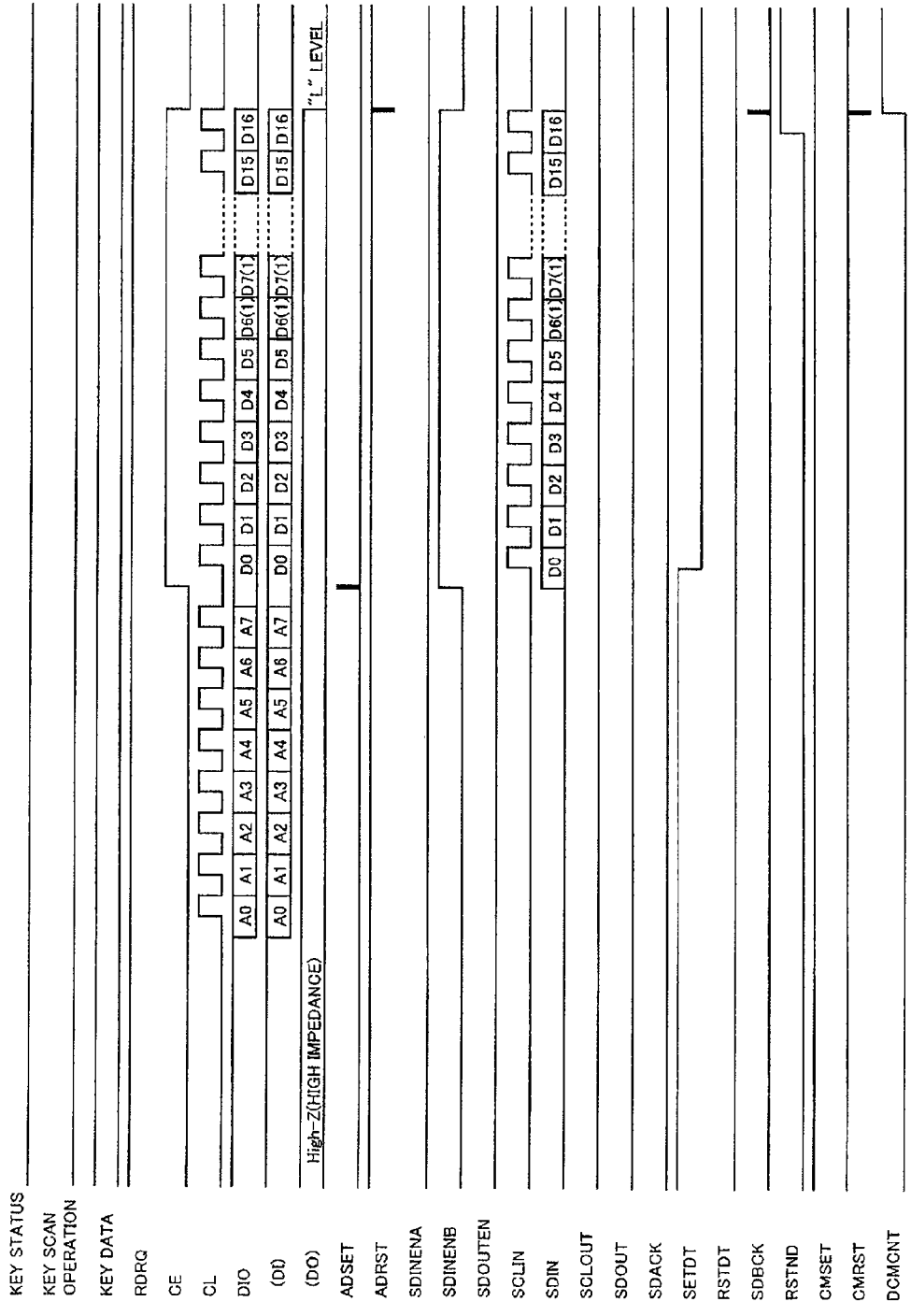

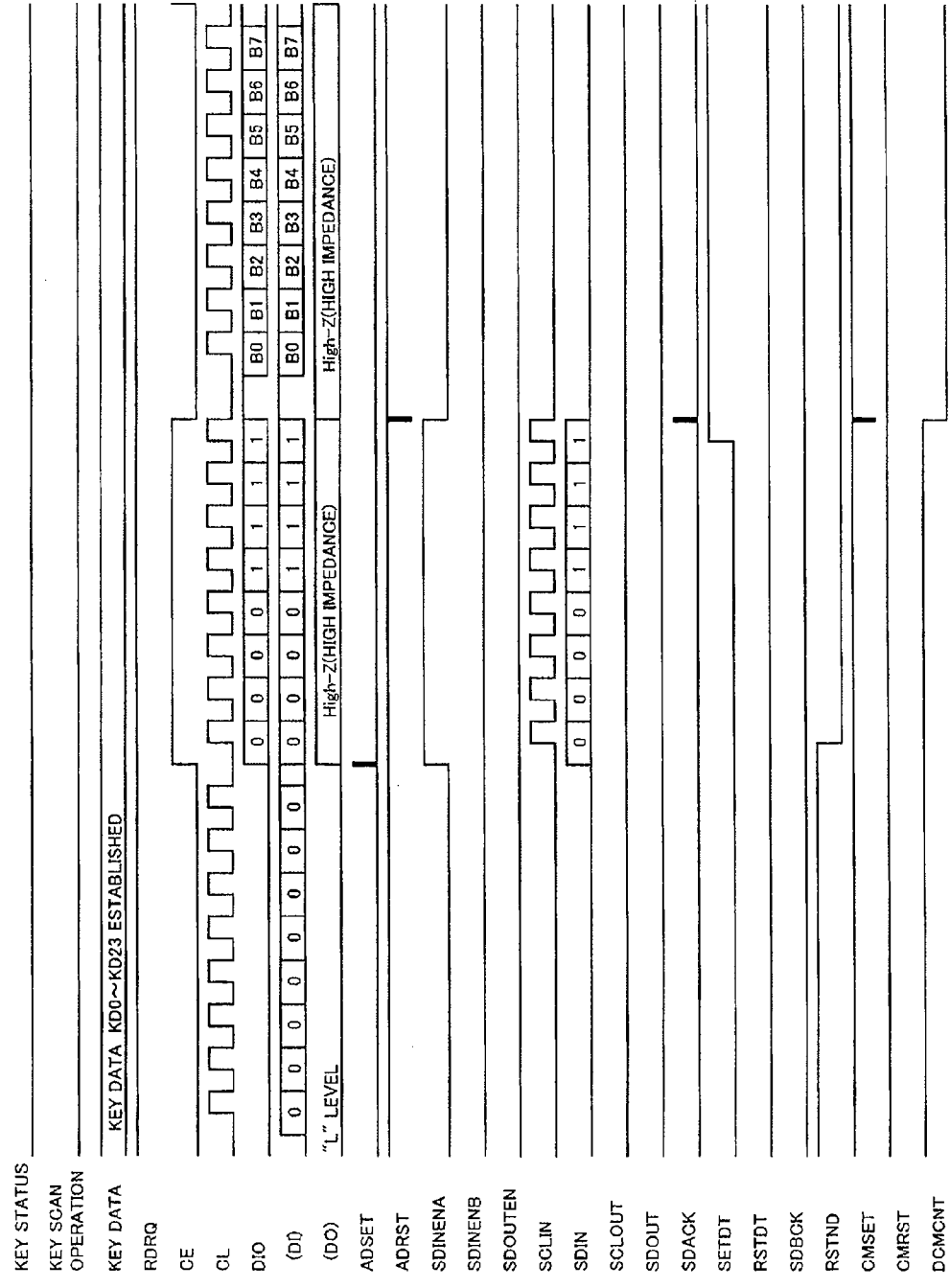

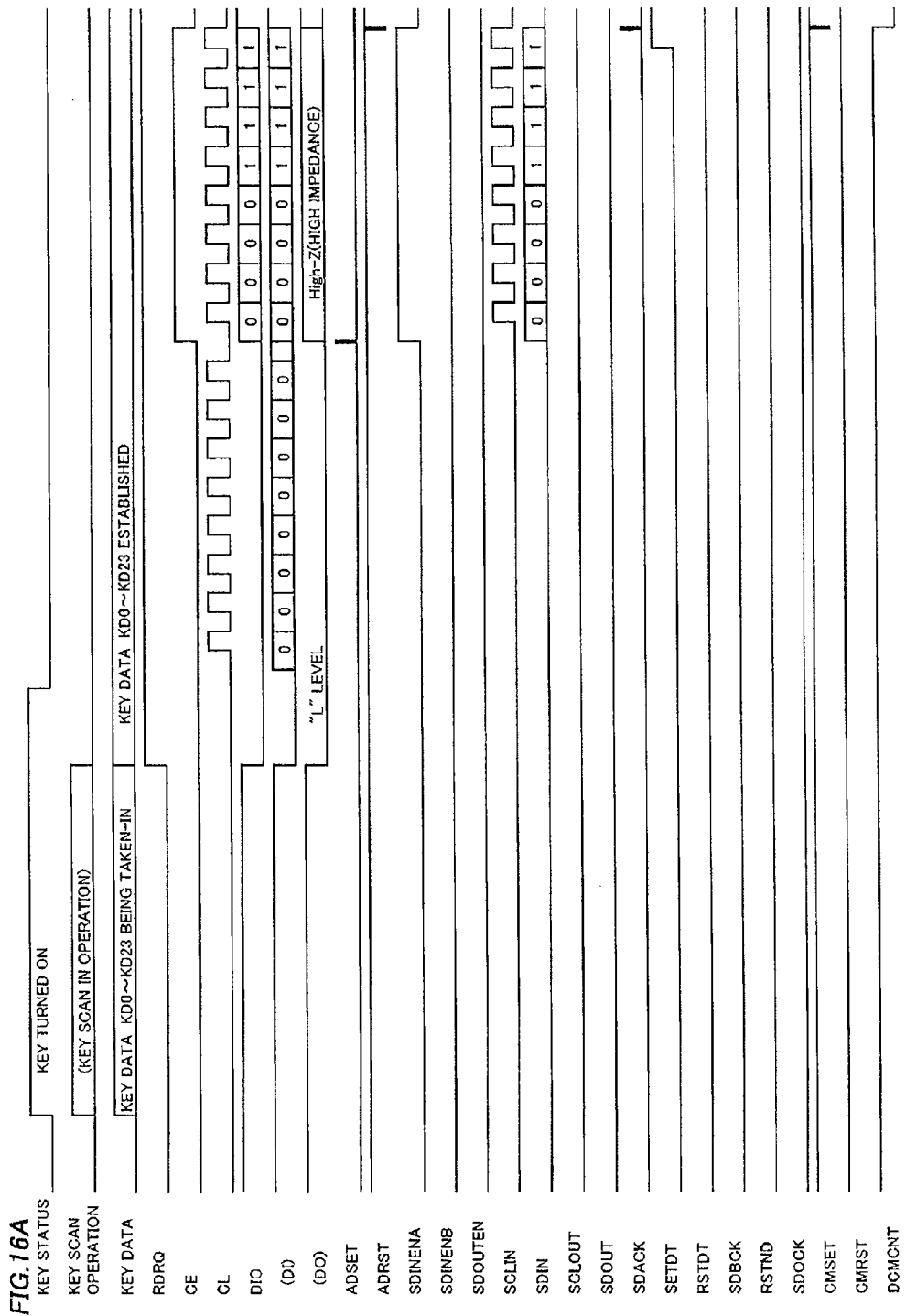

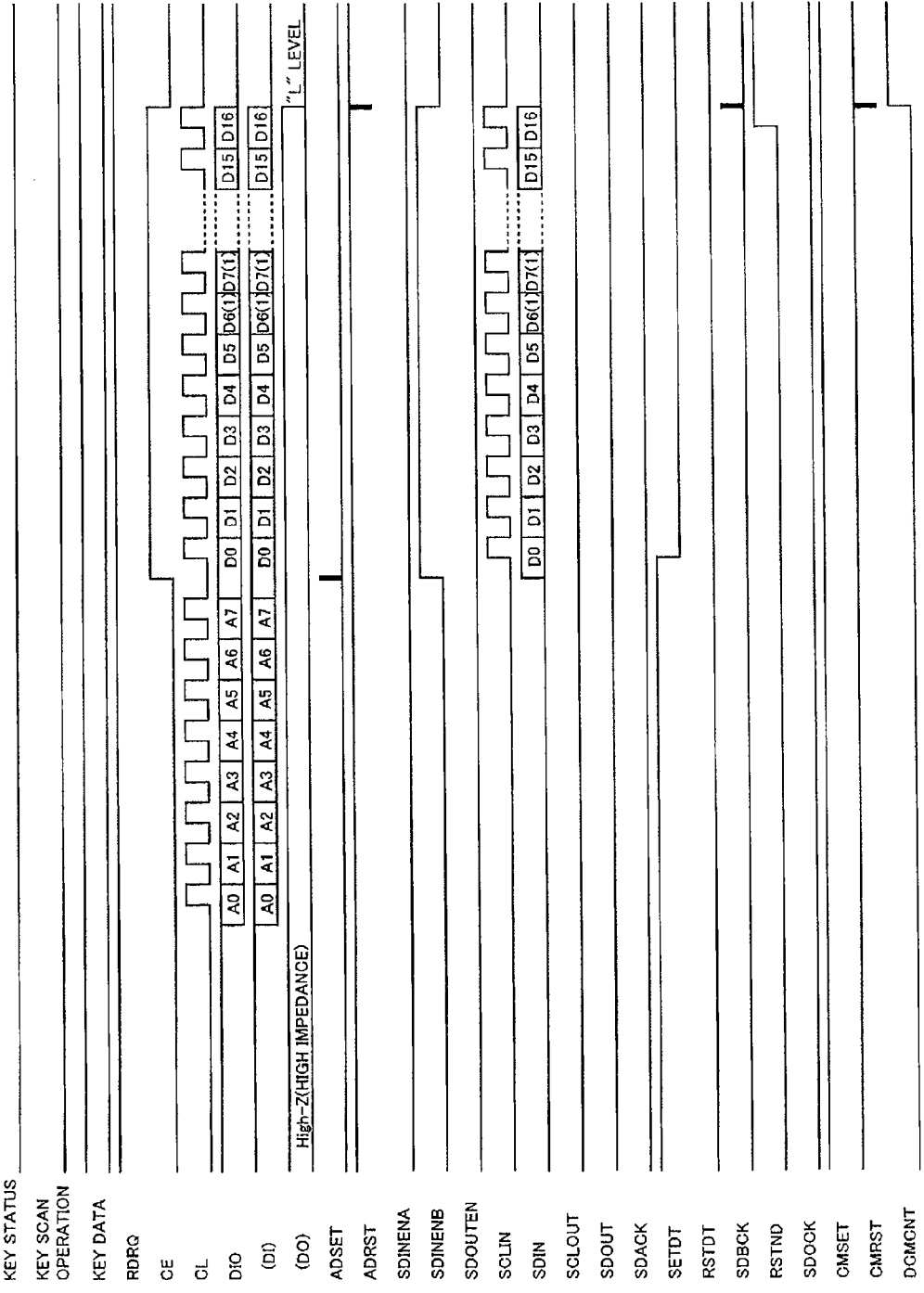

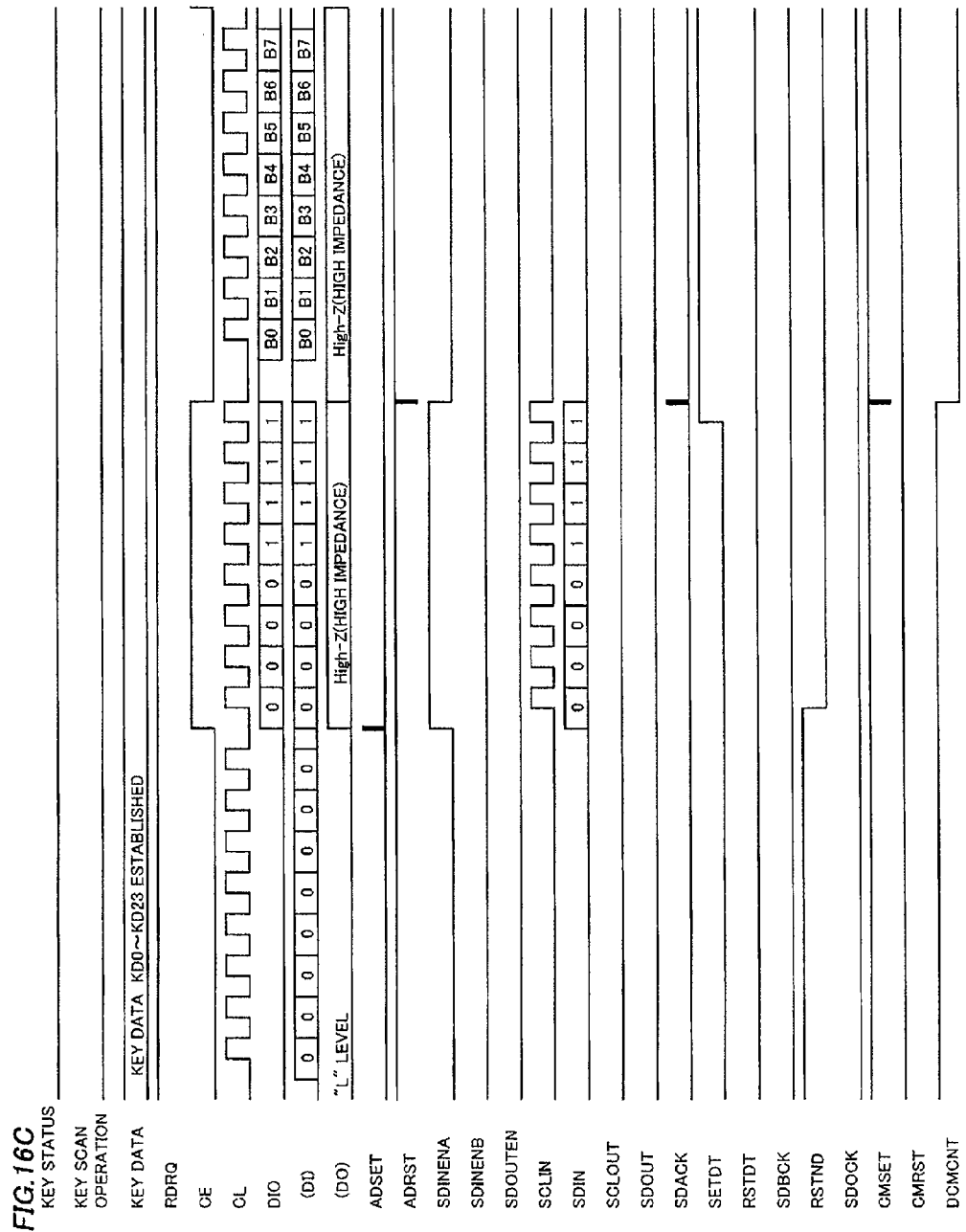

NOISE-TOLERANT DATA COMMUNICATION SYSTEM

CROSS-REFERENCE OF THE INVENTION

This application claims priority from Japanese Patent Application No. 2007-204082, the content of which is incorporated herein by reference in its entirety.

BACKGROUND OF THE INVENTION

1. Field of the Invention

This invention relates to a data communication system to perform data communication between a host and a device.

2. Description of the Related Art

FIG. 26 shows a structure of a conventional data communication system for a car audio. In the system, data communication between a microcomputer 100 and each of four ICs (Integrated Circuits) is performed through four communication lines, that are a control line (CE) 111, a clock line (CL) 112, a data input line (DI) 113 and a data output line (DO) 114. The control line 111 provides a control signal CE and the clock line 112 provides a clock CL. The data input line 113 is used to input the data into the ICs, while the data output line 114 is used to output the data from the ICs. The four ICs are a display driver IC 115, a key scan IC 116, a DSP (Digital Signal Processor) 117 and an RDS/DARC (Radio Data System/Data Radio Channel) 118. Between the key scan IC 116 and the microcomputer 100, in particular, serial data communication is performed through the four lines described above.

This kind of data communication system has been adopted in a very large number of electronic equipment, since it enables detecting a data read-in request signal (a signal to request reading-in of key data stored in the key scan IC 116, for example) using the data output line 114, that is, transmitting the data read-in request signal to the microcomputer 100, as well as realizing very simple data communication.

However, with the number of data lines being fixed to four, it is not a preferable communication method when there is a limitation on the number of input/output ports of the microcomputer 100 or there is a limitation on the number of signal lines drawn on a circuit board such as a printed circuit board or a flexible board or on the number of signal lines going through a connector.

In order to reduce the number of communication lines, there has been contrived a three-line data communication system having the control line, the clock line and a data input/output line that consolidates the data input line 113 and the data output line 114 (Refer to Japanese Patent Application Publication No. H09-238150.). However, there has been a problem that it is not possible to receive an address for inputting the serial data and an address for outputting the serial data while the data read-in request signal is outputted to the data input/output line, because an electric potential of the data input/output line is fixed at an L (low) level when the control signal CE is at the L level.

In order to solve the problem, a function of the data read-in request signal may be removed, or a terminal dedicated to output the data read-in request signal may be provided. However, enabling both the data transmission/reception function and the detection of the data read-in request signal eventually requires four communication lines which are not preferable in the case where there is the limitation on the number of communication lines as described above.

In order to solve the problem described above, there has been contrived another three-line data communication system in which the data read-in request signal is outputted to the data input/output line (Refer to Japanese Patent Application Publication No. H09-238151). However, because a control method to transmit the address to the data input/output line (a method to turn the data input/output line into a high impedance state) is limited to changing the clock CL (from the L level to an H (high) level or from the H level to the L level), there is a possibility that the data input/output line might be turned to the high impedance by error to hinder accurate detection of the data read-in request signal when a noise or the like is induced in the data input/output line.

As described above, there has been required a data communication system that enables performing both data communication and detection of the data read-in request signal while reducing the number of communication lines from the conventional four, and accurately detecting the data read-in request signal even when the noise is induced in the data line.

SUMMARY OF THE INVENTION

The invention provides a data communication system that includes a host, a device, a control line connecting the host and the device so as to convey a control signal, a clock line connecting the host and the device so as to convey a clock, and a data line connecting the host and the device so as to convey data. The data line receives a data read-in request signal from the device and sends the data read-in request signal to the host when the control signal is at a first level. The data read-in request signal requests reading-in of the data by the host.

The system includes a data line control circuit controlling the data line so that outputting of the data read-in request signal to the data line is disabled when first command data is inputted from the host to the device through the data line in synchronization with the clock and that the outputting of the data read-in request signal to the data line is enabled when second command data is inputted from the host to the device through the data line in synchronization with the clock. Alternatively, the system includes a data line control circuit controlling the data line so that outputting of the data read-in request signal to the data line is disabled when command data is inputted from the host to the device through the data line in synchronization with the clock and that the outputting of the data read-in request signal to the data line is enabled when the data is outputted from the device to the data line in synchronization with the clock. Or, the system includes a data line control circuit controlling the data line so that outputting of the data read-in request signal to the data line is disabled when command data from the host is inputted to the device through the data line in synchronization with the clock and that the outputting of the data read-in request signal to the data line is enabled when the data is inputted from the host to the device through the data line in synchronization with the clock.

BRIEF DESCRIPTION OF THE DRAWINGS

FIGS. 7A-7D are timing charts showing operation of the data communication system according to the first embodiment of this invention.

FIGS. 10A-10D are timing charts showing operation of the data communication system according to the second embodiment of this invention.

FIGS. 13A-13D are timing charts showing operation of the data communication system according to the third embodiment of this invention.

FIGS. 16A-16D are timing charts showing operation of the data communication system according to the fourth embodiment of this invention.

DETAILED DESCRIPTION OF THE INVENTION

Figure 1:
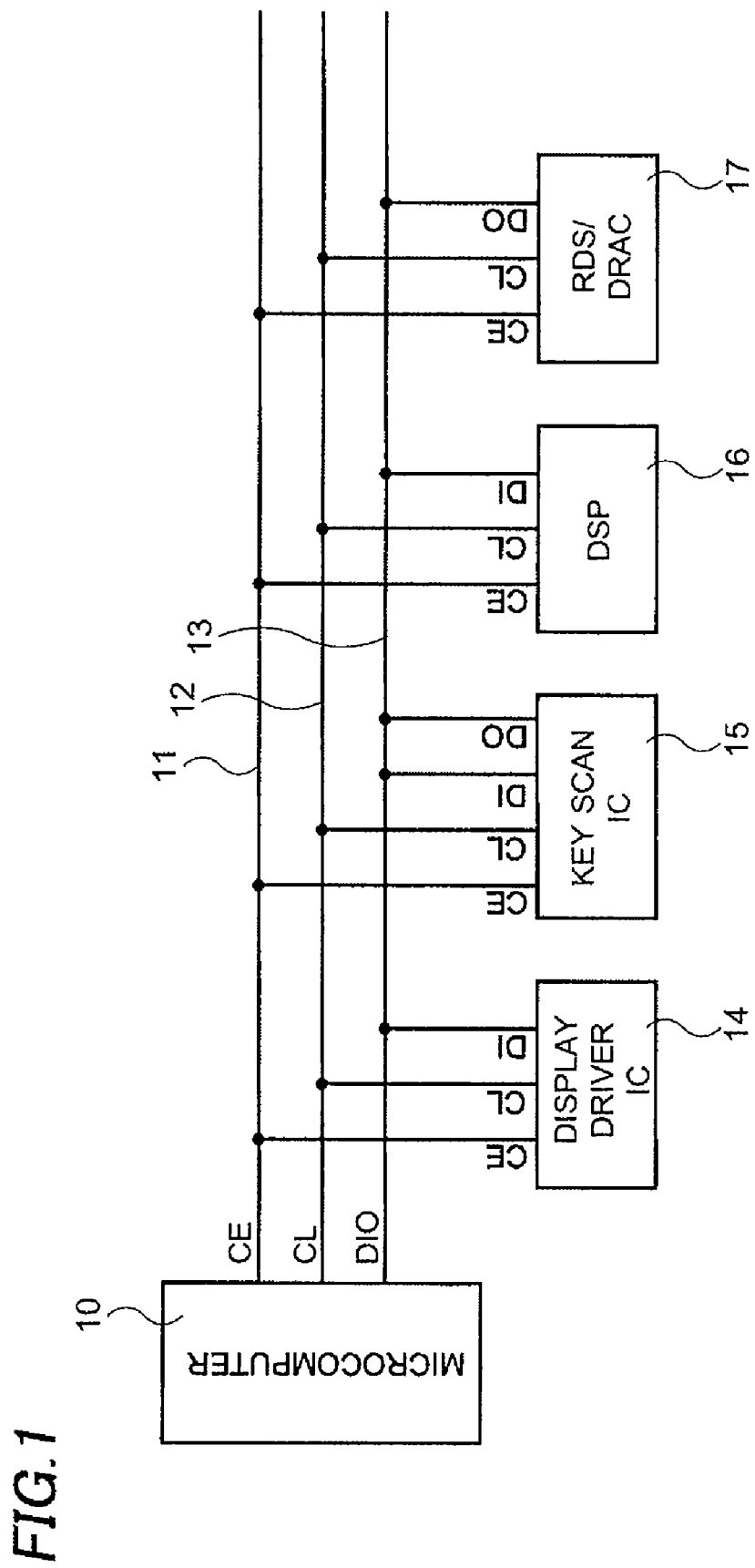
FIG. 1 shows a structure of a data communication system according to a first embodiment of this invention.

A data communication system according to a first embodiment of this invention is described hereinafter. FIG. 1 shows a structure of the data communication system for a car audio. In the system, data communication is performed among a microcomputer 10 (an example of "host" in this invention) and four ICs (examples of "devices" in this invention) through three lines, which are a control line (CE) 11, a clock line (CL) 12 and a data line (DIO) 13. A control signal CE is provided through the control line 11, a clock CL is provided through the clock line 12, and data is inputted and outputted through the data line 13. The data line 13 is connected to a power supply electric potential Vdd through a pull-up resistor Rpu that has a high resistance.

The four ICs are a display driver IC 14, a key scan IC 15, a DSP 16 and an RDS/DARC (Radio Data System/Data Radio Channel) 17. Data communication including inputting and outputting the data is performed between the key scan IC 15 and the microcomputer 10 through the three lines described above.

Figure 2:
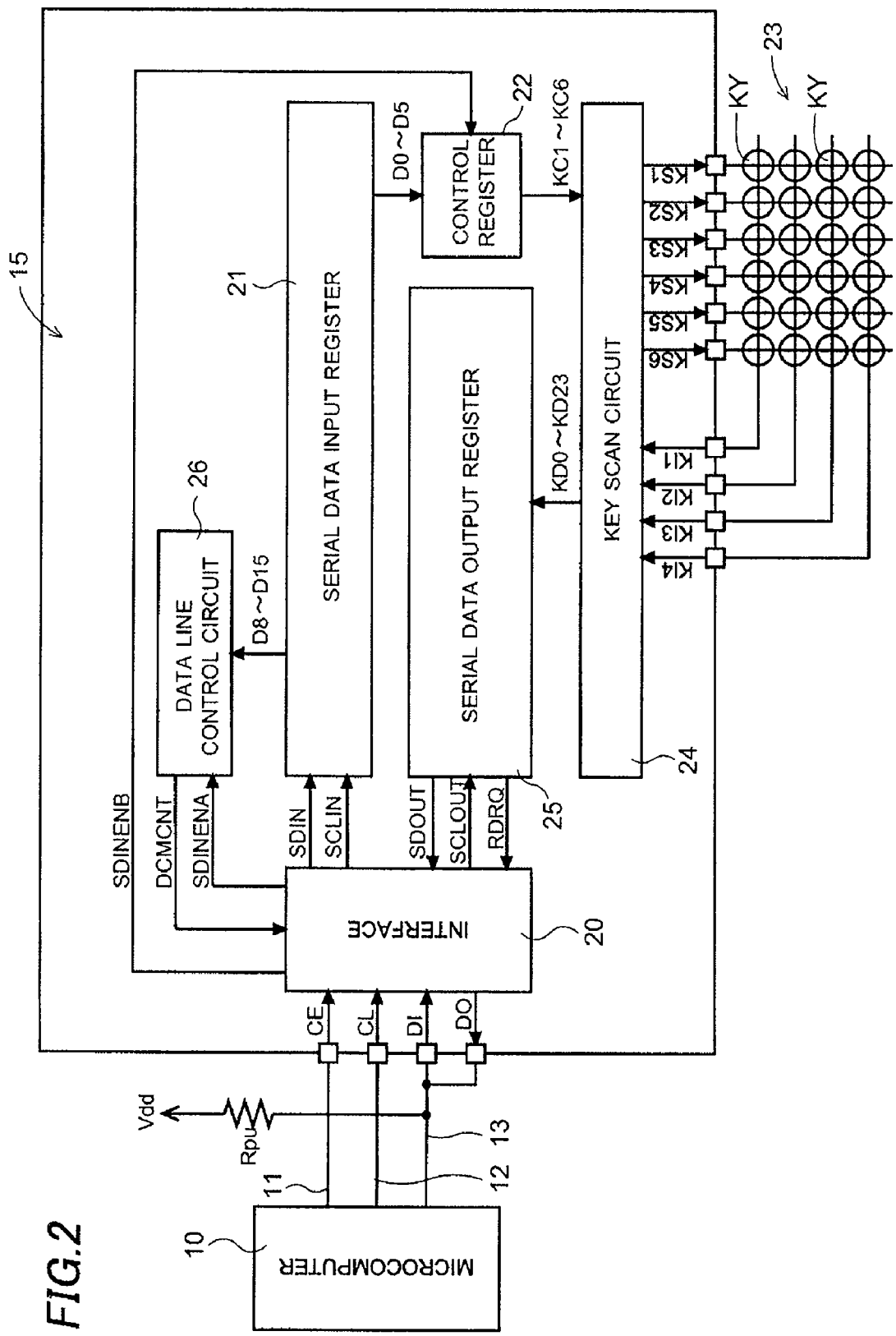
FIG. 2 shows a structure of the data communication system according to the first embodiment of this invention between a microcomputer and a key scan IC.

FIG. 2 shows a structure of the data communication system between the microcomputer 10 and the key scan IC 15. An interface 20 is provided inside the key scan IC 15 and controls transmission and reception of the data to and from the microcomputer 10. The data outputted from the microcomputer 10 to the data line 13 is received by the interface 20 and stored into a serial data input register 21. There is provided a control register 22 that takes in serial data D0-D5 that is stored in the serial data input register 21.

A key matrix 23 that is composed of a plurality of keys KY arrayed in a matrix form is provided outside the key scan IC 15 for a "person" to operate the audio equipment. A key scan circuit 24 detects turning ON/OFF of the keys in the key matrix 23 by key scan signals KS1-KS6 and KI1-KI4, and outputs key data KD0-KD23 that are results of the detection. The key data KD0-KD23 are 24 bits of data since the key matrix 23 is formed of a matrix of four rows by six columns in this example. The serial data D0-D5 stored in the control register 22 are used to control an operational state of the key scan circuit 24.

The key data KD0-KD23 outputted from the key scan circuit 24 are stored into a serial data output register 25, and a key data read-in request signal RDRQ is outputted from the serial output register 25 at the same time. The key data KD0-KD23 stored in the serial data output register 25 and the key data read-in request signal RDRQ outputted from the serial data output register 25 are outputted to the data line 13 through the interface 20, and are detected by and read into the microcomputer 10. That is, the serial data output register 25 has a function to output the key data read-in request signal RDRQ to the microcomputer 10 as well as a function to transmit the key data KD0-KD23 to the microcomputer 10.

There is provided a data line control circuit 26 that outputs a data line control signal DCMCNT to control functions (a function to transmit/receive the data and a function to detect the key data read-in request signal RDRQ) of the data line 13 that connects the microcomputer 10 and the key scan IC 15.

Figure 3:
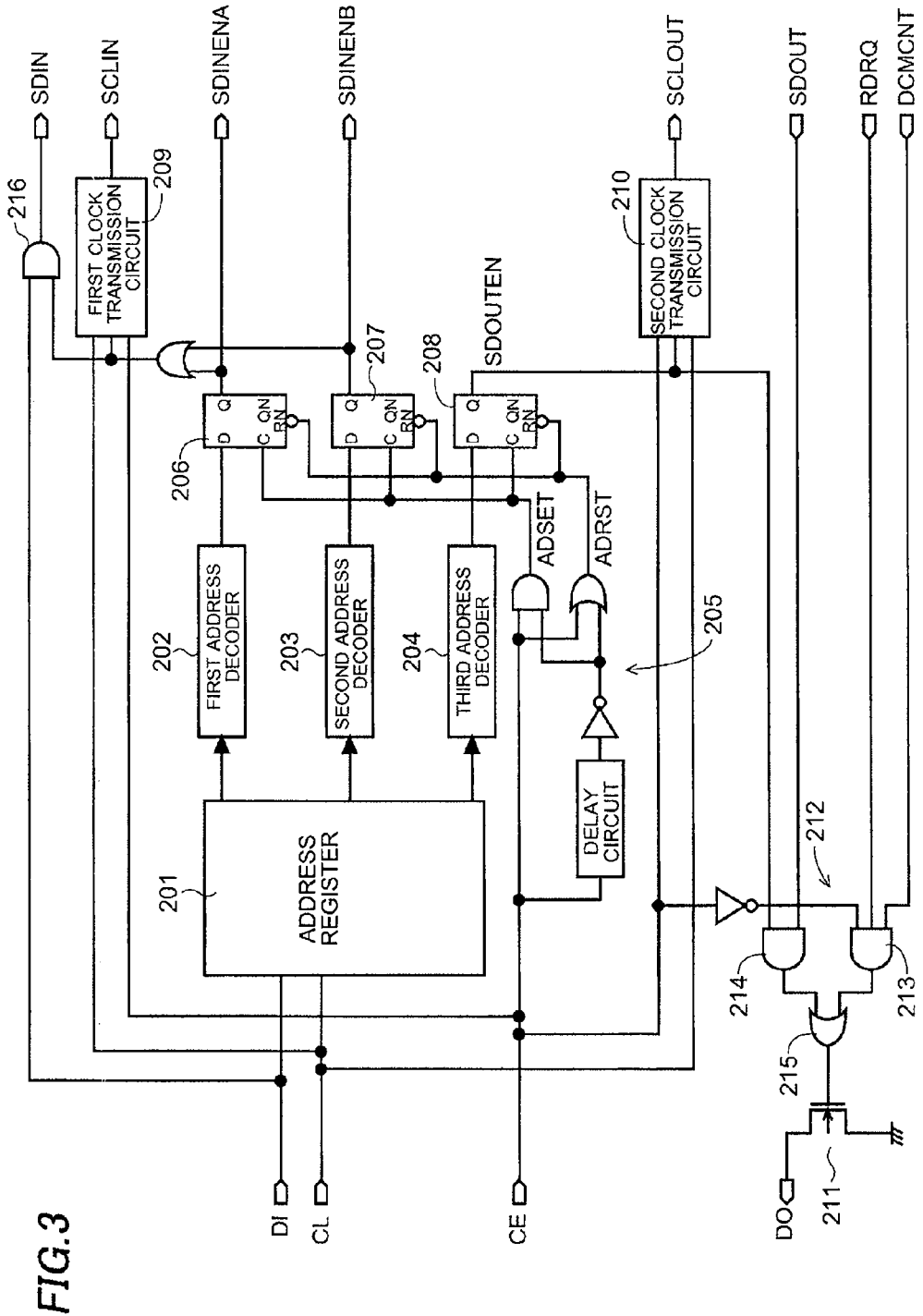
FIG. 3 shows a structure of an interface in the data communication system according to the first embodiment of this invention.

A structure of the interface 20 is shown in FIG. 3. An address register 201 takes in various kinds of addresses transmitted from the microcomputer 10 through the data line 13 in synchronization with the clock CL. The addresses, the serial data and command data are inputted through a data input terminal DI that is connected to the data line 13.

A first address decoder 202 compares an address for inputting the command data taken into the address register 201 with an address for inputting the command data, which is pre-assigned to the key scan IC 15, and outputs a signal of an H (high) level only when the addresses coincide with each other. A second address decoder 203 compares an address for inputting the serial data taken into the address register 201 with an address for inputting the serial data, which is pre-assigned to the key scan IC 15, and outputs a signal of the H level only when the addresses coincide with each other. A third address decoder 204 compares an address for outputting the serial data taken into the address register 201 with an address for outputting the serial data, which is pre-assigned to the key scan IC 15, and outputs a signal of the H level only when the addresses coincide with each other.

A rise/fall detection circuit 205 detects a rise and a fall of the control signal CE, and is configured to generate a set signal ADSET that is a clock pulse of the H level when the control signal CE rises to the H level, and generates a reset signal ADRST that is a clock pulse of an L (low) level when the control signal CE falls to the L level.

A first flip-flop 206 takes in the output of the first address decoder 202 in response to the set signal ADSET and resets its output to the L level in response to the reset signal ADRST. When the output of the first address decoder 202 is at the H level, the signal of the H level is stored in the first flip-flop 206 as a command data input enable signal SDINENA.

A second flip-flop 207 takes in the output of the second address decoder 203 in response to the set signal ADSET and resets its output to the L level in response to the reset signal ADRST. When the output of the second address decoder 203 is at the H level, the signal of the H level is stored in the second flip-flop 207 as a serial data input enable signal SDINENB.

A third flip-flop 208 takes in the output of the third address decoder 204 in response to the set signal ADSET and resets its output to the L level in response to the reset signal ADRST. When the output of the third address decoder 204 is at the H level, the signal of the H level is stored in the third flip-flop 208 as a serial data output enable signal SDOUTEN.

A first clock transmission circuit 209 and an AND circuit 216 transmit the clock CL and the data inputted to the terminal DI, respectively, to the serial data input register 21 based on either the command data input enable signal SDINENA or the serial data input enable signal SDINENB. Also, a second clock transmission circuit 210 transmits the clock CL to the serial data output register 25 based on the serial data output enable signal SDOUTEN.

The serial data and the key data read-in request signal RDRQ are outputted to a terminal DO that is connected to the data line 13 together with the terminal DI. The terminal DO is connected with a drain of an output transistor 211 that is formed of an N-channel type MOS transistor. A gate of the output transistor 211 is connected with an output control circuit 212 that controls turning on/off of the output transistor 211. The key data read-in request signal RDRQ, the data line control signal DCMCNT from the data line control circuit 26 and a reverse signal of the control signal CE are inputted to an AND circuit 213 in the output control circuit 212.

Also, the serial data output enable signal SDOUTEN and an output signal SDOUT from the serial data output register 25 are inputted to an AND circuit 214 in the output control circuit 212. Outputs of the two AND circuits 213 and 214 are inputted to an OR circuit 215 in the output control circuit 212. An output of the OR circuit 215 is applied to the gate of the output transistor 211. That is, outputting of the key data read-in request signal RDRQ is disabled when the data line control signal DCMCNT is at the L level, and is enabled when the data line control signal DCMCNT is at the H level. Also, outputting of the output signal SDOUT of the serial data output register 25 is enabled when the serial data output enable signal SDOUTEN is at the H level.

Figure 4:
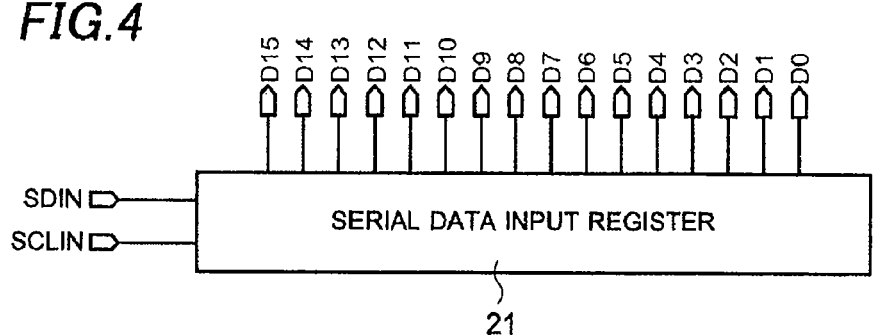
FIG. 4 shows a structure of a serial data input register.
Figure 5:
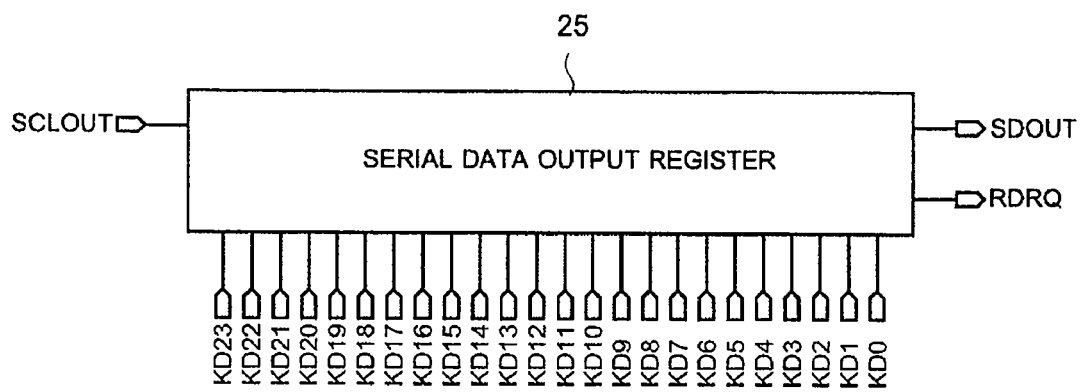
FIG. 5 shows a structure of a serial data output register.
Figure 6:
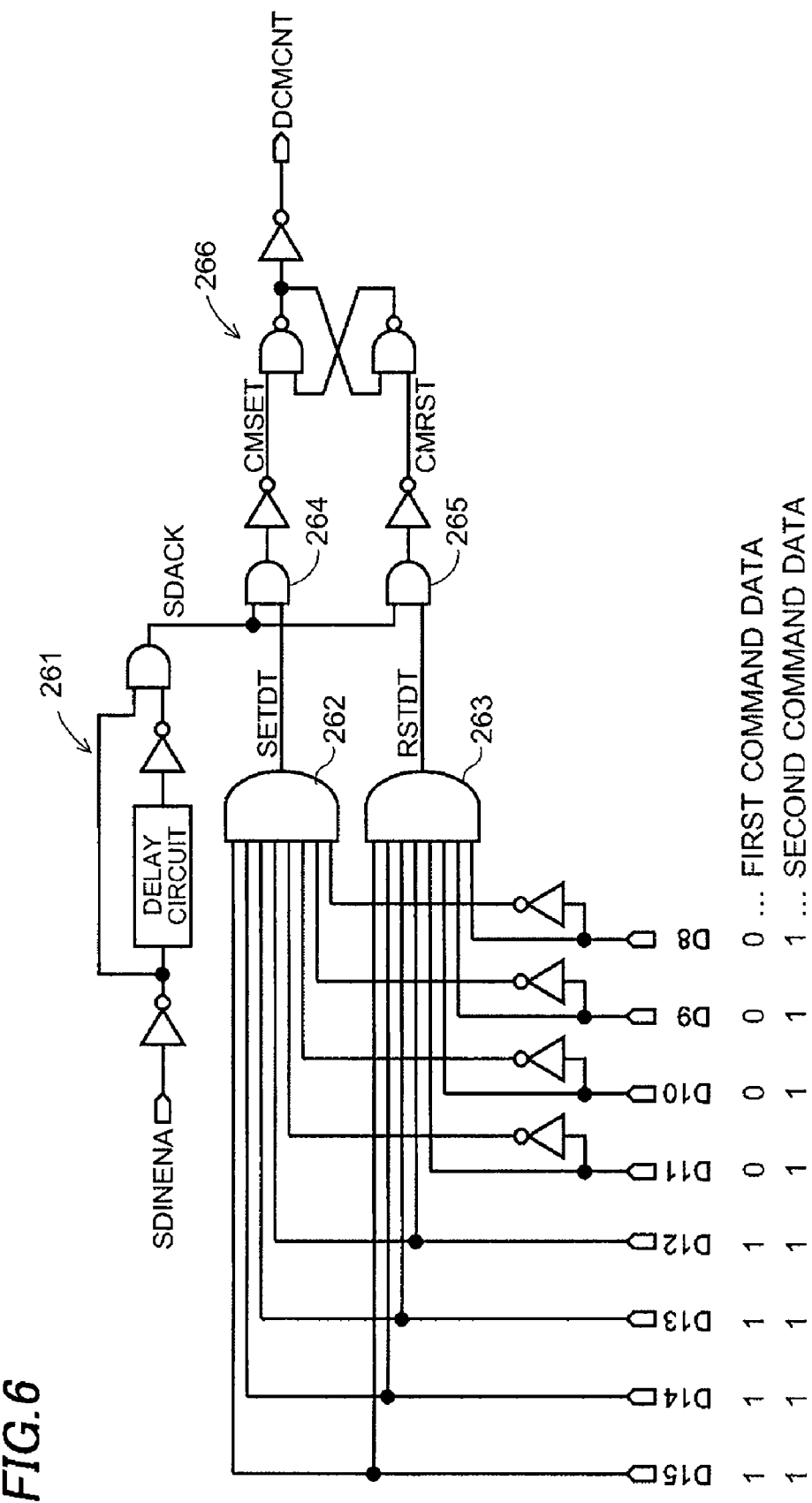
FIG. 6 shows a structure of a data line control circuit in the data communication system according to the first embodiment of this invention.
Figure 7C:
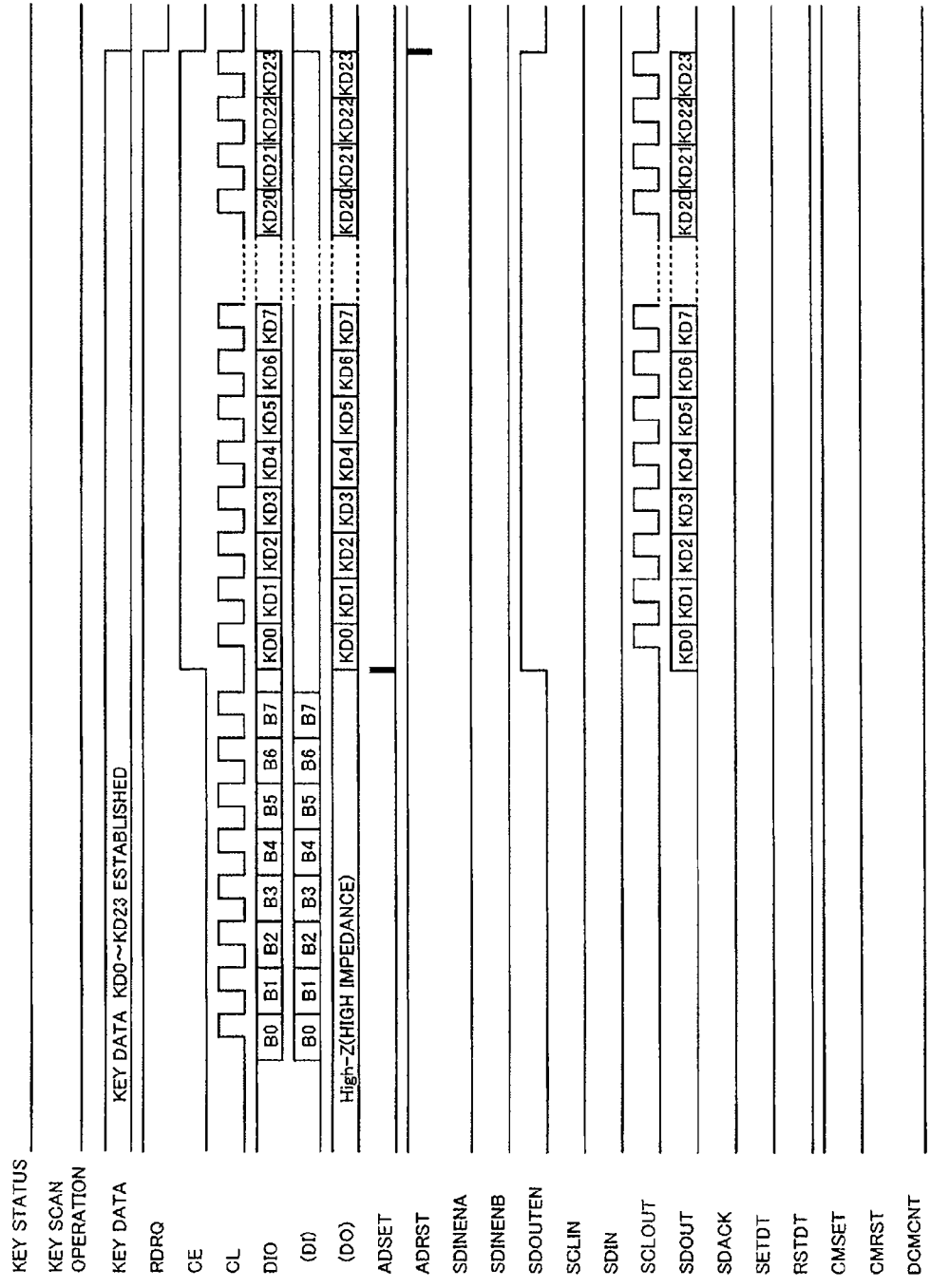
Figure 7D:
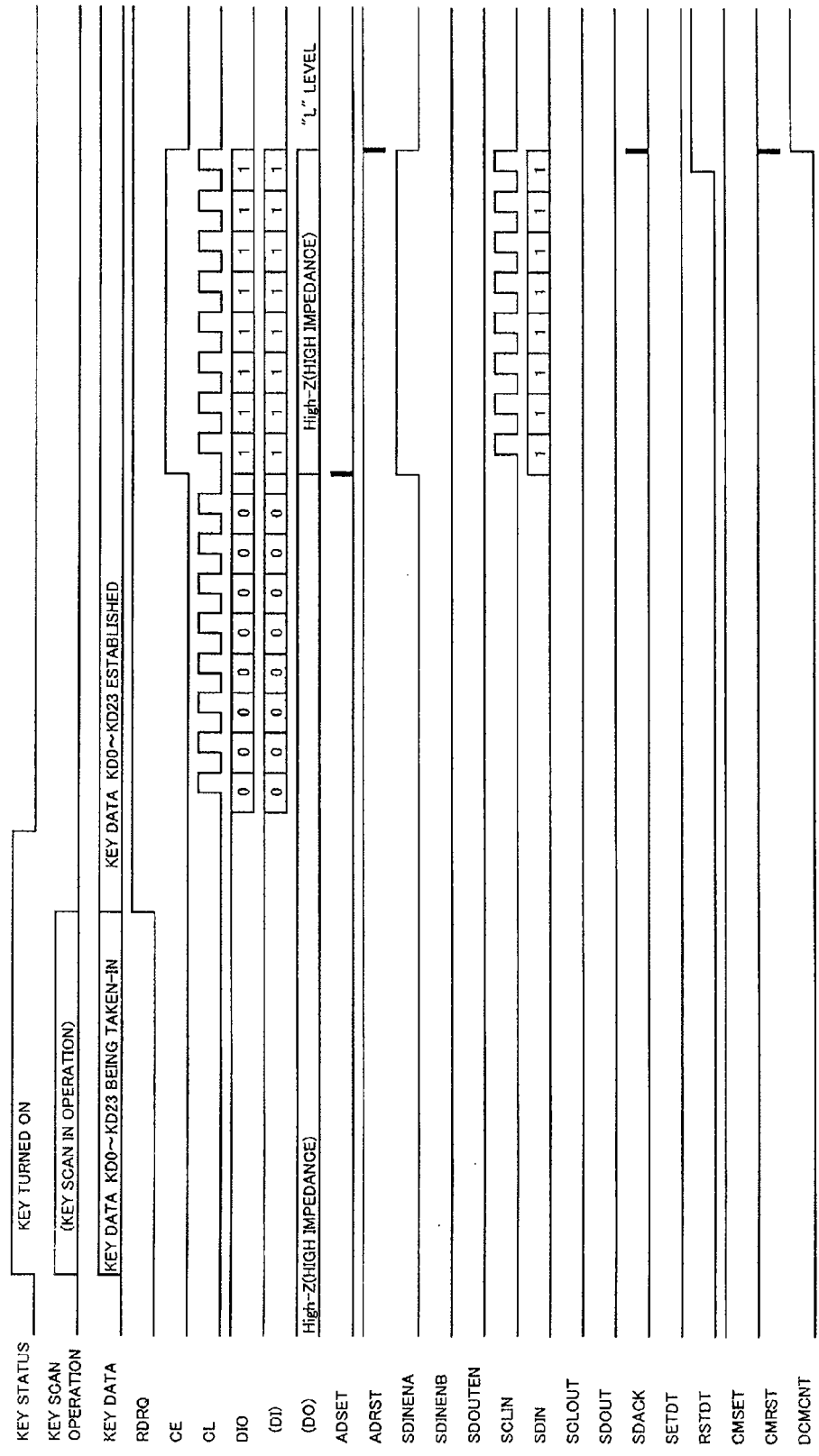

A structure of the serial data input register 21 is shown in FIG. 4, while a structure of the serial data output register 25 is shown in FIG. 5. A structure of the data line control circuit 26 is shown in FIG. 6. Upper eight bits D8-D15 of the serial data stored in the serial data input register 21 are taken into the data line control circuit 26. The eight bits D8-D15 of the serial data correspond to the command data. A fall detection circuit 261 detects a fall of the command data input enable signal SDINENA to the L level and generates a signal SDACK that is a clock pulse of the H level. An AND circuit 262 detects first command data "00001111" and outputs a set signal SETDT of the H level. Also, an AND circuit 263 detects second command data "11111111" and outputs a reset signal RSTDT of the H level. The signal SDACK and the set signal SETDT are inputted to an AND circuit 264, while the signal SDACK and the reset signal RSTDT are inputted to an AND circuit 265.

That is, when the signal SDACK is generated and the first command data "00001111" is detected to output the set signal SETDT, a signal CMSET is turned to the L level to set an RS flip-flop 266, and the data line control signal DCMCNT varies from the H level to the L level. On the other hand, when the signal SDACK is generated and the second command data "11111111" is detected to output the reset signal RSTDT, a signal CMRST is turned to the L level to reset the RS flip-flop 266, and the data line control signal DCMCNT varies from the L level to the H level.

Operation of the data communication system according to the first embodiment of this invention will be explained hereinafter, referring to timing charts shown in FIGS. 7A-7D. When any key KY in the key matrix 23 is turned ON, the key scan circuit 24 is put into operation and subsequently the key data KD0-KD23 are stored into the serial data output register 25. Then, the key data read-in request signal RDRQ of the H level is outputted from the serial data output register 25.

The key data read-in request signal RDRQ is inputted to the interface 20 shown in FIG. 3. In a state in which the data communication is not performed, the serial data output enable signal SDOUTEN is at the L level and the control signal CE is at the L level. When the data line control signal DCMCNT is at the H level, the gate of the output transistor 211 at the terminal DO is turned to the H level to turn the data line 13 to the L level. Thus the key data read-in request (the data line 13=L level) is outputted to the microcomputer 10 through the data line 13.

Next, there is explained a case in which serial data input/output is performed in the state described above. Since ordinary data transmission/reception can be not performed while the data line 13 remains at the L level, following command data are inputted before doing anything else, in order to establish a state in which the ordinary data transmission/reception can be performed.

At first, the address "00000000" for inputting the command data is inputted in synchronization with the clock CL while the control signal CE is at the L level, and the address "00000000" is taken into the address register 201 in the interface 20.

Since the address "00000000" taken into the address register 201 is the address for inputting the command data, the first address decoder 202 detects the coincidence of the addresses and outputs the signal of the H level.

After that, when the control signal CE turns from the L level to the H level, the set signal ADSET (a clock pulse of the H level) is generated to store the signal of the H level outputted from the first address decoder 202 into the first flip-flop 206 as the command data input enable signal SDINENA.

When the control signal CE is at the H level, the output transistor 211 is turned off to turn the terminal DO into a high impedance state and consequently to turn the data line 13 into a high impedance state as well. Therefore, the data transmission is enabled for a period during which the control signal CE is at the H level.

After that, when the first command data "00001111" is serially inputted in synchronization with the clock CL in the period during which the control signal CE is at the H level, the clock CL appears in a signal SCLIN that is an output signal of the first clock transmission circuit 209, the first command data "00001111" appears in a signal SDIN that is an output signal of the AND circuit 216, and the first command data is inputted into the serial data input register 21 in synchronization with the clock CL.

When all of the first command data "00001111" is taken into the serial data input register 21, the control signal CE is turned from the H level to the L level to generate the reset signal ADRST (a clock pulse of the L level), which turns the command data input enable signal SDINENA from the H level to the L level to halt the data transfer to the serial data input register 21. While the first command data "00001111" is stored into the D8-D15 in the serial data input register 21 as described above, they are outputted to the data line control circuit 26.

When the command data input enable signal SDINENA turns from the H level to the L level, there is generated a pulse of the H level in the signal SDACK in the data line control circuit 26. Because the data "00001111" is stored in D8-D15 in the serial data input register 21, the set signal SETDT turns to the H level to generate a pulse of the L level in the signal CMSET, which sets the RS flip-flop 266 to change the data line control signal DCMCNT from the H level to the L level.

After the operations described above, the serial data output enable signal SDOUTEN is at the L level, the control signal CE is at the L level, and the data line control signal DCMCNT is turned to the L level. Therefore, the ordinary data transmission/reception is made possible even when the key data read-in request signal RDRQ is at the H level, because the gate of the output transistor 211 at the terminal DO in the interface 20 becomes the L level to turn off the output transistor 211 and to make the electric potential on the data line 13 the H level (high impedance).

Next, when an ordinary serial data input operation is performed, an address A0-A7 for inputting eight-bit serial data is serially inputted to the terminal DI through the data line 13 in synchronization with the clock CL while the control signal CE is at the L level, and the address A0-A7 is taken into the address register 201.

Since the address A0-A7 taken into the address register 201 is the address for inputting the serial data in this case, the second address decoder 203 outputs a signal of the H level. After that, when the control signal CE turns from the L level to the H level, the set signal ADSET (a clock pulse of the H level) is generated to store the signal of the H level outputted from the second address decoder 203 into the second flip-flop 207 as the serial data input enable signal SDINENB.

After that, when 16-bit input data D0-D15 is serially inputted in synchronization with the clock CL while the control signal CE is at the H level, the clock CL appears in the signal SCLIN and the input data D0-D15 appears in the signal SDIN. Thus, the data D0-D15 is inputted into the serial data input register 21 in synchronization with the clock CL.

When all bits of the input data D0-D15 are taken into the serial data input register 21, the control signal CE is turned from the H level to the L level to generate the reset signal ADRST which turns the serial data input enable signal SDINENB from the H level to the L level to halt the data transfer to the serial data input register 21.

In the case where the serial data is outputted subsequently, an address B0-B7 for outputting eight-bit serial data is serially inputted to the terminal DI through the data line 13 in synchronization with the clock CL while the control signal CE is at the L level, and the address B0-B7 is taken into the address register 201.

Since the address B0-B7 taken into the address register 201 is the address for outputting the serial data, the third address decoder 204 outputs a signal of the H level. After that, when the control signal CE turns from the L level to the H level, the set signal ADSET is generated to store the signal of the H level outputted from the third address decoder 204 into the third flip-flop 208 as the serial data output enable signal SDOUTEN.

After that, when the clock CL is inputted while the control signal CE is at the H level, the clock CL appears in a signal SCLOUT that is an output signal of the second clock transmission circuit 210. Inputting the clock CL into the serial data output register 25 causes the key data KD0-KD23 to appear in the signal SDOUT which is the output signal of the serial data output register 25. Thus, the key data KD0-KD23 are outputted to the interface 20 in synchronization with the clock CL.

When the key data KD0-KD23 are outputted to the interface 20, the key data KD0-KD23 are outputted through the terminal DO to the data line 13, since the serial data output enable signal SDOUTEN and the control signal CE are at the H level.

When all of the key data KD0-KD23 are outputted from the serial data output register 25, the control signal CE is turned from the H level to the L level to generate the reset signal ADRST which turns the serial data output enable signal SDOUTEN from the H level to the L level to halt outputting the data from the serial data output register 25, while the key data read-in request signal RDRQ varies from the H level to the L level to turn off the output transistor 211 at the same time. As a result, the data line 13 turns to a high impedance state.

Then, when any key KY in the key matrix 23 is turned ON once again, the key scan circuit 24 is put into operation and subsequently the key data KD0-KD23 are stored into the serial data output register 25 and the key data read-in request signal RDRQ is turned from the L level to the H level.

The key data read-in request signal RDRQ of the H level is inputted to the interface 20. At that time, although the serial data output enable signal SDOUTEN is at the L level and the control signal CE is at the L level, the data line 13 remains at the H level (high impedance) because the data line control signal DCMCNT remains at the L level which keeps the gate of the output transistor 211 at the L level to keep the output transistor 211 turned off.

However, the situation described above means that the key data read-in request (the data line 13=L level) is not outputted to the microcomputer 10, even though the key KY is turned ON. Therefore, the second command data is inputted as described below so as to establish a state in which the key data read-in request (the data line 13=L level) can be outputted.

At first, the address "00000000" for inputting the command data is inputted in synchronization with the clock CL while the control signal CE is at the L level, and the address "00000000" is taken into the address register 201. Since the address "00000000" taken into the address register 201 is the address for inputting the command data, the first address decoder 202 outputs a signal of the H level.

After that, when the control signal CE turns from the L level to the H level, the set signal ADSET is generated to store the signal of the H level outputted from the first address decoder 202 into the first flip-flop 206 as the command data output enable signal SDINENA. Since the terminal DO is in the high impedance state when the control signal CE is at the H level, the data line 13 also keeps the high impedance state.

After that, when the second command data "11111111" is inputted in synchronization with the clock CL while the control signal CE is at the H level, the clock CL appears in the signal SCLIN in the interface 20 and the second command data "11111111" appears in the signal SDIN. Thus, the command data is inputted into the serial data input register 21 in synchronization with the clock CL.

When all of the second command data "11111111" is taken into the serial data input register 21, the control signal CE is turned from the H level to the L level to generate the reset signal ADRST which turns the command data input enable signal SDINENA from the H level to the L level to halt the data transfer to the serial data input register 21.

When the command data input enable signal SDINENA turns from the H level to the L level, there is generated a pulse of the H level in the signal SDACK in the data line control circuit 26. Because the second command data "11111111" is stored in D8-D15 in the serial data input register 21, the reset signal RSTDT turns to the H level to generate a pulse of the L level in the signal CMRST, which resets the RS flip-flop 266 to turn the data line control signal DCMCNT from the L level to the H level.

As results of the operations described above, the serial data output enable signal SDOUTEN is at the L level, the control signal CE is at the L level, and the data line control signal DCMCNT is at the H level. Since the key data read-in request signal RDRQ is at the H level, the gate of the output transistor 211 at the terminal DO becomes the H level and the data line 13 becomes the L level. The situation described above means that the key data read-in request (the data line 13=L level) is outputted to the microcomputer 10.

With the data communication system according to the first embodiment, as described above, both the data communication and the detection of the data read-in request signal can be performed with the three lines that are the control line 11, the clock line 12 and the data line 13. In addition, it is tolerant of the noise since switching the functions (a function to transmit and receive the data and a function to detect the key data read-in request) of the data line 13 is carried out by inputting operations of the first and second command data.

Figure 8:
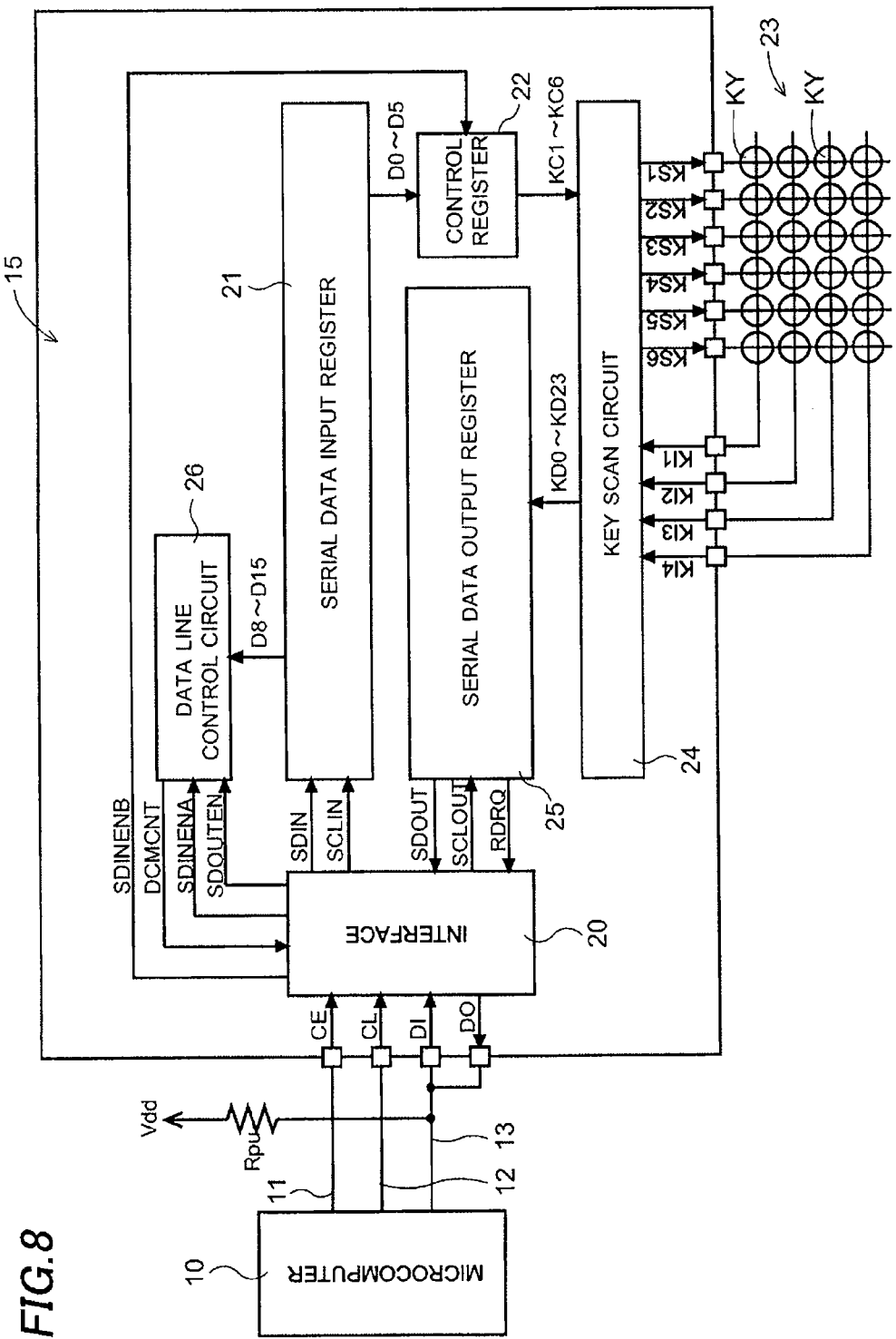
FIG. 8 shows a structure of a data communication system according to a second embodiment of this invention between a microcomputer and a key scan IC.
Figure 9:
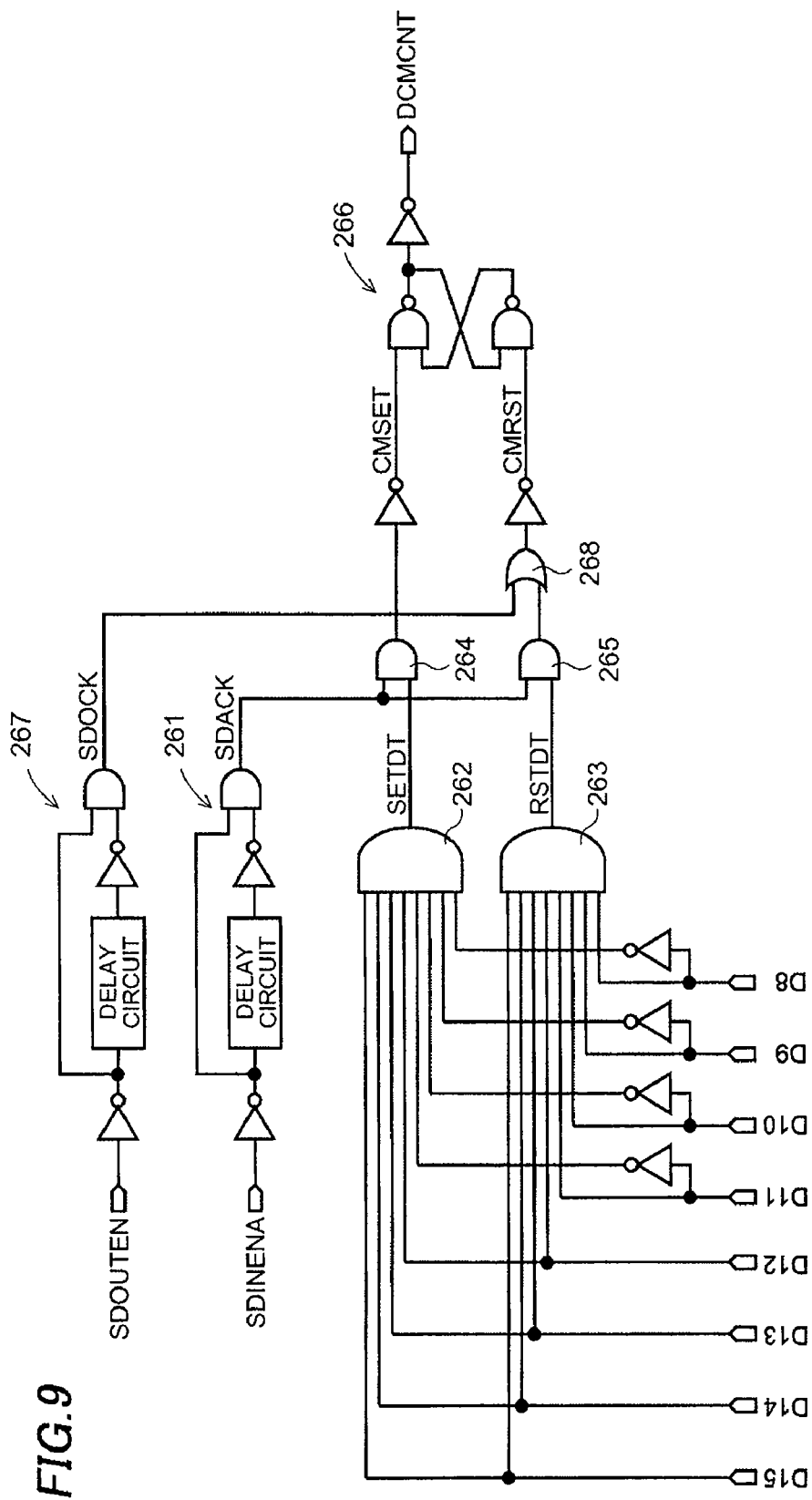
FIG. 9 shows a structure of a data line control circuit in the data communication system according to the second embodiment of this invention.
Figure 10C:
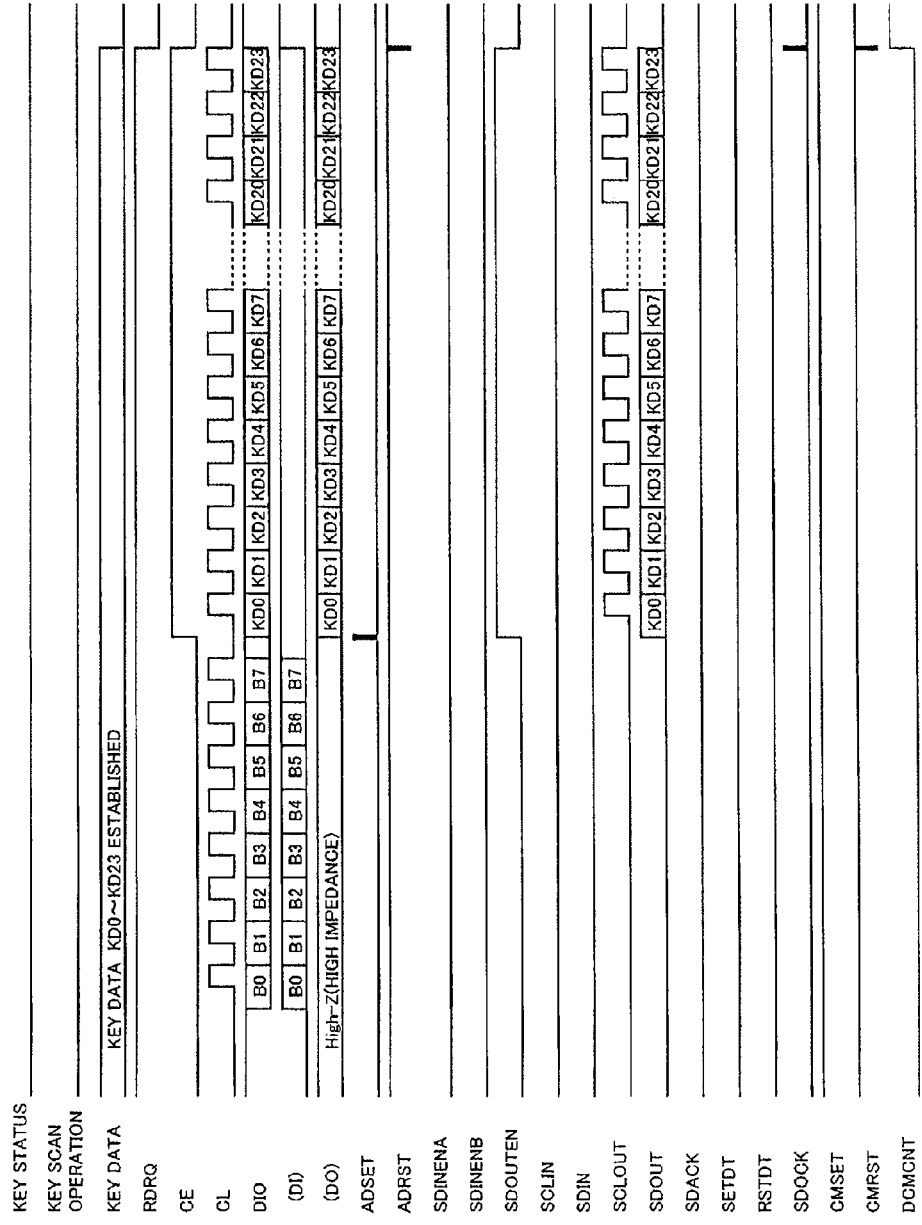

FIG. 8 shows a structure of a data communication system according to a second embodiment of this invention between the microcomputer 10 and the key scan IC 15. A difference from the data communication system according to the first embodiment is in that the serial data output enable signal SDOUTEN generated in the interface 20 to control the data transmission/reception to and from the microcomputer 10 is inputted to the data line control circuit 26. FIG. 9 shows a structure of the data line control circuit 26.

The data line control circuit 26 is provided with a fall detection circuit 267 that detects a fall of the serial data output enable signal SDOUTEN. Also, there is provided a NOR circuit 268 to which an output signal SDOCK of the fall detection circuit 267 and an output signal of the AND circuit 265 are inputted.

That is, while the function of the data line 13 is switched only by inputting operation of the command data in the first embodiment, the function of the data line 13 is switched to output a data read-in request by resetting the RS flip-flop 266 to turn the data control signal DCMCNT to the H level when outputting the serial data is completed in the second embodiment. Other structures are the same as those in the first embodiment.

Operations of the data communication system according to the second embodiment of this invention will be explained hereinafter referring to timing charts shown in FIGS. 10A-10D. Explanations on the operations from turning on of any key in the key matrix 23 to outputting of the serial data, including inputting of the serial data in between, are omitted because they are the same as those in the first embodiment.

Thus, operations after the outputting of the serial data will be explained. When all of the key data KD0-KD23 are outputted from the serial data output register 25, the control signal CE is turned from the H level to the L level to generate the reset signal ADRST which turns the serial data output enable signal SDOUTEN from the H level to the L level to halt outputting the data from the serial data output register 25, while the key data read-in request signal RDRQ varies from the H level to the L level to turn off the output transistor 211 at the same time. As a result, the data line 13 turns to a high impedance state.

When the serial output enable signal SDOUTEN is varied from the H level to the L level, there is generated a signal SDOCK (a pulse of the H level) in the data line control circuit 26, which in turn generates the signal CMRST (a pulse of the L level) that changes the data line control signal DCMCNT from the L level to the H level.

Since the serial data output enable signal SDOUTEN is at the L level, the control signal CE is at the L level and the data line control signal DCMCNT is at the H level as results of the operations described above, it is made possible that the state of the key data read-in request signal RDRQ is outputted to the data line 13 through the terminal DO in the interface 20.

That is, when any key KY in the key matrix 23 is turned on once again after outputting operation of the serial data is completed, the key scan circuit 24 is put into operation. After that, when the key data KD0-KD23 are stored into the serial data output register 25, the key data read-in request signal RDRQ is turned to the H level, resulting in outputting the key data read-in request (data line 13=L level) to the microcomputer 10.

With the data communication system according to the second embodiment, both the data communication and the detection of the data read-in request signal can be performed with the three lines that are the control line 11, the clock line 12 and the data line 13. In addition, it is tolerant of the noise since switching the functions (a function to transmit and receive the data and a function to detect the key data read-in request) of the data line 13 is carried out by inputting operation of the command data and outputting operation of the serial data.

Figure 11:
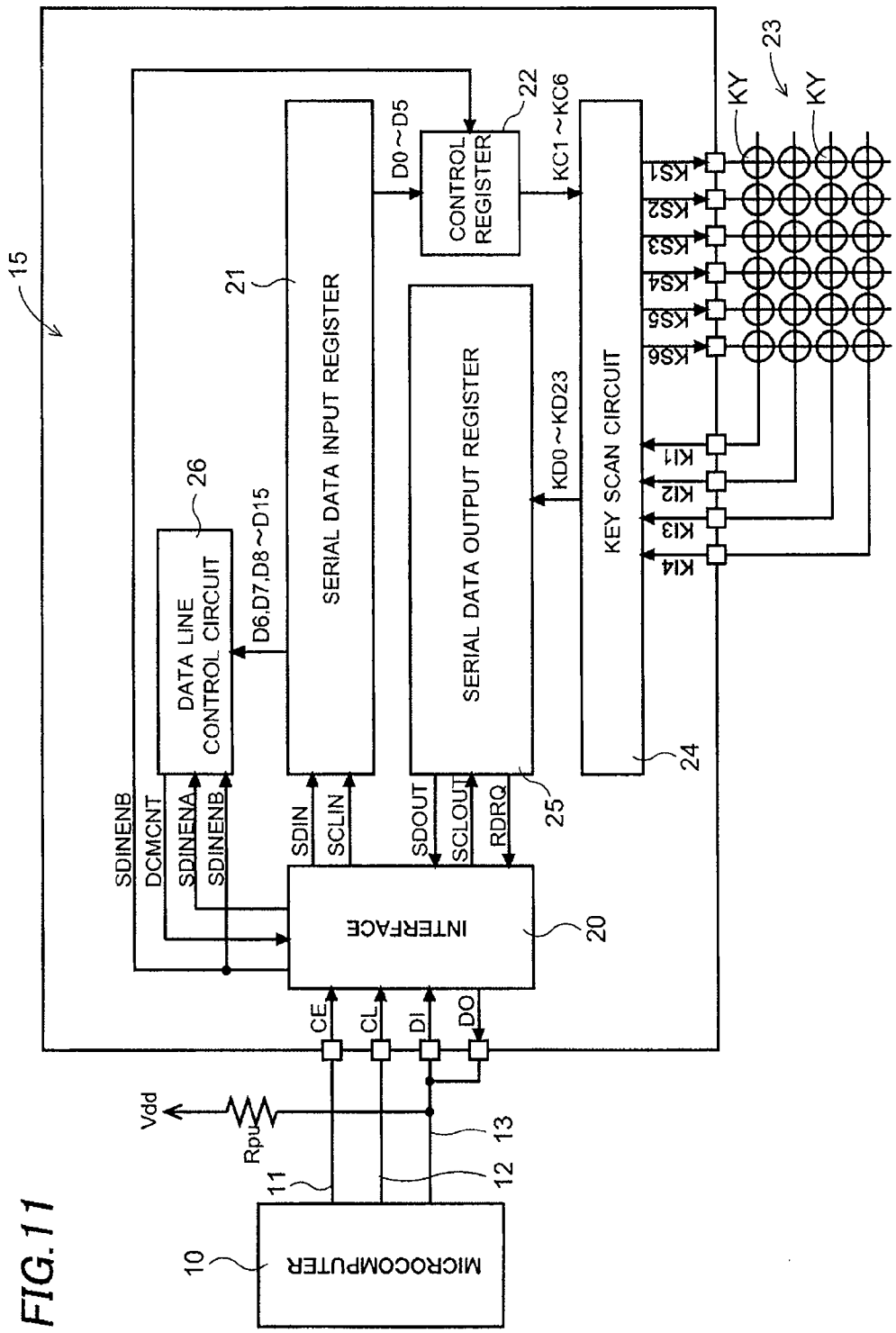
FIG. 11 shows a structure of a data communication system according to a third embodiment of this invention between a microcomputer and a key scan IC.
Figure 12:
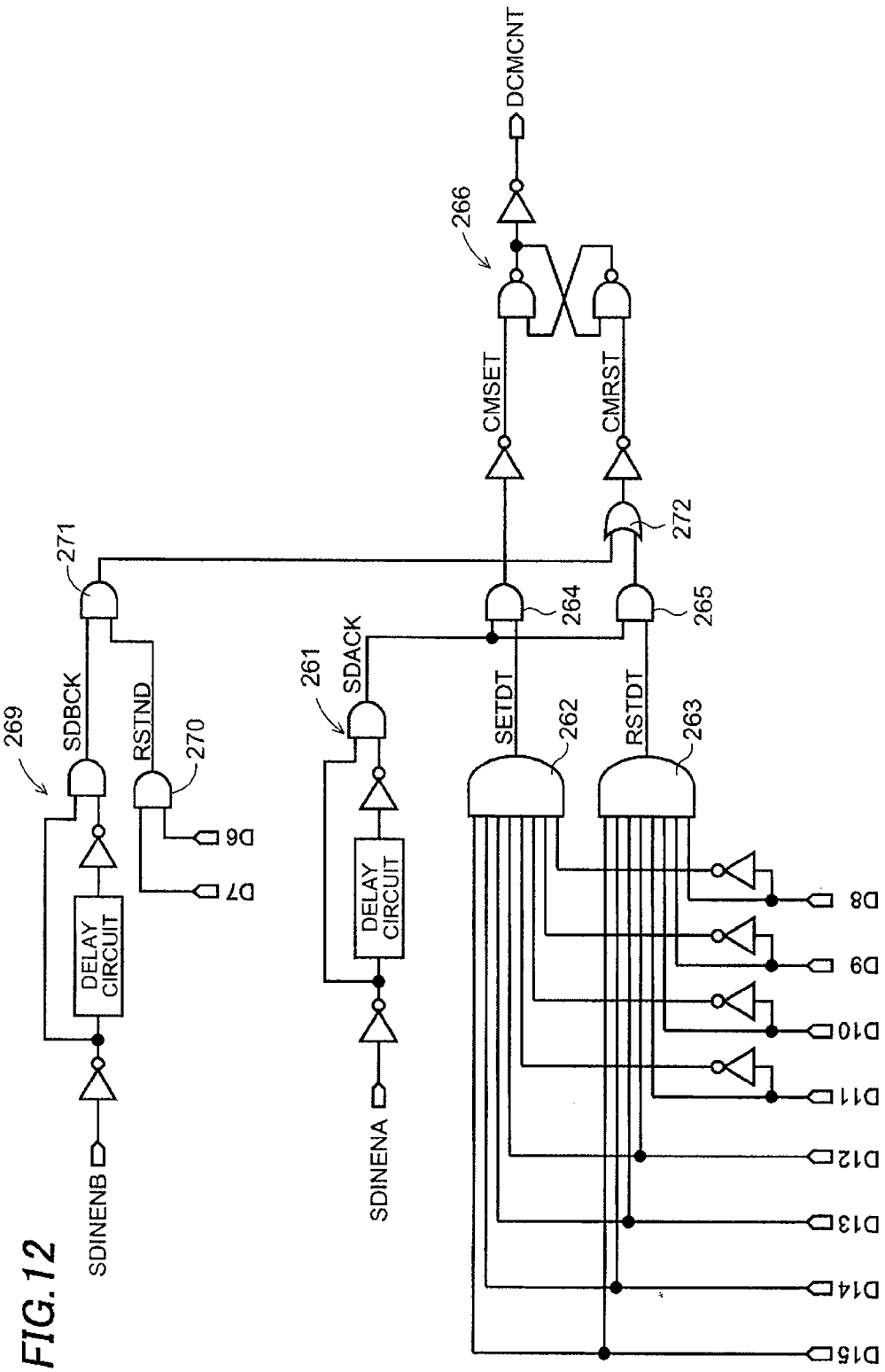
FIG. 12 shows a structure of a data line control circuit in the data communication system according to the third embodiment of this invention.
Figure 13D:
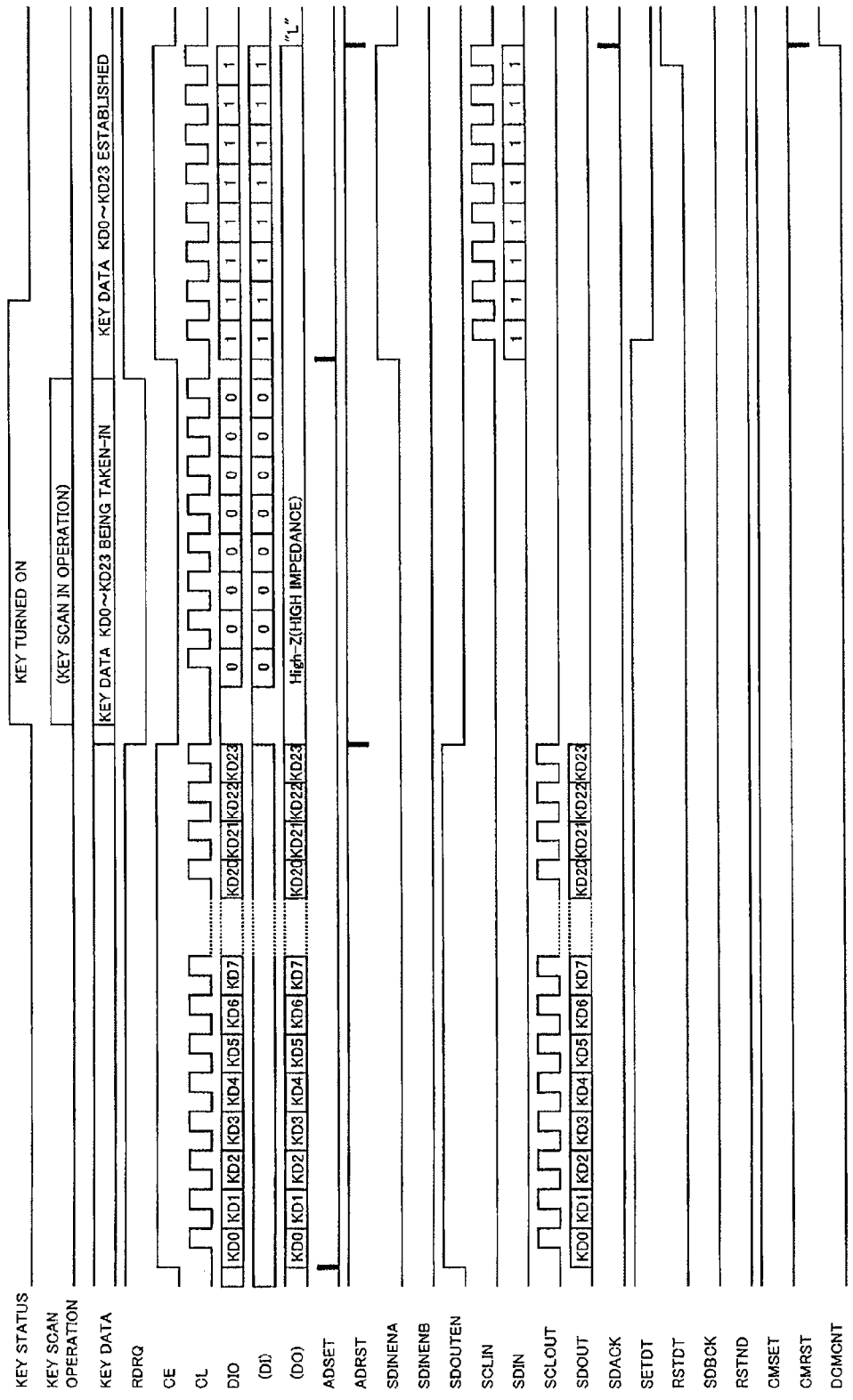

FIG. 11 shows a structure of a data communication system according to a third embodiment of this invention between the microcomputer 10 and the key scan IC 15. Differences from the data communication system according to the first embodiment are in that the serial data input enable signal SDINENB is inputted to the data line control circuit 26 and in that the serial data D6 and D7 inputted to the serial data input register 21 are inputted to the data line control circuit 26. FIG. 12 shows a structure of the data line control circuit 26.

The data line control circuit 26 is provided with a fall detection circuit 269 that detects a fall of the serial data input enable signal SDINENB. Also, there is provided an AND circuit 270 to which the serial data D6 and D7 are inputted. When both the serial data D6 and D7 are "1", an output of the AND circuit 270 is at the H level. In addition, there are provided an AND circuit 271 to which an output signal RSTND of the AND circuit 270 and an output signal SDBCK of the fall detection circuit 269 are inputted and a NOR circuit 272 to which an output signal of the AND circuit 271 and an output signal of the AND circuit 265 are inputted.

That is, while the function of the data line 13 is switched only by inputting operation of the command data in the first embodiment, the data line 13 is switched into a state in which the data read-in request can be outputted by resetting the RS flip-flop 266 to turn the data control signal DCMCNT to the H level in the case where both the serial data D6 and D7 are "1"

after inputting of the serial data is completed in the third embodiment. Other structures are the same as those in the first embodiment.

Followings are reasons why the data line 13 is switched into the state in which the data read-in request can be outputted by turning the data control signal DCMCNT to the H level in the case where the serial data D6 and D7 are specific values.

(1) In the case where inputting operation of the serial data is halted for a predetermined period, it is preferable that the data line 13 is kept in the state in which the data read-in request can be outputted, because the inputting operation of the serial data does not take place for the period that follows. Thus, both serial data D6 and D7 are set to be "1".

(2) In the case where inputting operation of the serial data is continued, it is preferable that the data line 13 remains in the state in which the outputting of the data read-in request is disabled. Thus, either of the serial data D6 and D7 is set to be "0". That is, because the control of the data line 13 is determined by the values of the serial data D6 and D7, inputting operation of the second command data is not required.

Operations of the data communication system according to the third embodiment of this invention will be explained hereinafter referring to timing charts shown in FIGS. 13A-13D.

Explanations on the operations from turning on of any key KY in the key matrix 23 to inputting of the serial data are omitted, because they are the same as those in the first embodiment.

Thus, operations after the inputting of the serial data will be explained. When all bits of the input data D0-D15 are taken into the serial data input register 21, the control signal CE is turned from the H level to the L level to generate the reset signal ADRST which turns the serial data input enable signal SDINENB from the H level to the L level to halt the data transfer to the serial data input register 21.

When the serial data input enable signal SDINENB turns from the H level to the L level, there is generated the signal SDBCK (a pulse of the H level) in the data line control circuit 26. Because the signal RSTND is at the H level when both the serial data D6 and D7 are "1", the reset signal CMRST (a pulse of the L level) is generated to reset the RS flip-flop 266 and to turn the data line control signal DCMCNT from the L level to the H level.

When either of serial data D6 and D7 is "0", the data line control signal DCMNCNT is kept at the L level because the signal RSTND is at the L level and the reset signal CMRST remains at the H level.

Since the serial data output enable signal SDOUTEN is at the L level, the control signal CE is at the L level and the data line control signal DCMCNT is at the H level as results of the operations described above, it is made possible that the state of the key data read-in request signal RDRQ is outputted to the data line 13 through the terminal DO in the interface 20. In the case represented by the timing chart shown in FIG. 13B, the data line 13 is turned to the L level because the key data read-in request signal RDRQ is at the H level. When either of the serial data D6 and D7 inputted in the inputting operation of the serial data is "0", the data line 13 is turned to the H level (high impedance).

Next operation is outputting the serial data. However, ordinary data transmission/reception can be not performed while the data line 13 is at the L level. Therefore, in order to establish the state in which the ordinary data transmission/reception can be performed, the first command data "00001111" is inputted by the same method as in the first embodiment.

As a result, the serial data output enable signal SDOUTEN is at the L level, the control signal CE is at the L level, and the data line control signal DCMCNT is at the L level. Thus, the ordinary data transmission/reception can be performed even when the key data read-in request signal RDRQ is at the H level, because the gate of the output transistor 211 at the terminal DO in the interface 20 is at the L level to turn the data line 13 to the H level (high impedance).

In the case where either of the serial data D6 and D7 inputted in the inputting operation of the serial data is "0", the inputting operation of the command data is not required because the data line 13 is at the H level (high impedance).

Next, the serial data is outputted in the same way as in the first embodiment. When all of the key data KD0-KD23 are outputted, the control signal CE is turned from the H level to the L level to generate the reset signal ADRST (a clock pulse of the L level), which turns the serial data output enable signal SDOUTEN from the H level to the L level to halt outputting of the data from the serial data output register 25, while the key data read-in request signal RDRQ varies from the H level to the L level to turn the data line 13 to the H level (high impedance).

And when any key KY in the key matrix 23 is turned on once again, the key scan circuit 24 is put into operation and subsequently the key data KD0-KD23 are stored into the serial data output register 25 and the key data read-in request signal RDRQ is turned from the L level to the H level.

The gate of the N-channel transistor at the terminal DO remains at the L level to keep the data line 13 at the H level (high impedance), because the key data read-in request signal RDRQ of the H level is inputted to the interface 20, the serial data output enable signal SDOUTEN remains at the L level, the control signal CE remains at the L level and the data line control signal DCMCNT remains at the L level.

However, the situation described above means that the key data read-in request is not outputted to the microcomputer 10, even though the key KY is turned on. Therefore, the second command data "11111111" is inputted as in the first embodiment so as to establish the state in which the key data read-in request (the data line 13=L level) is outputted.

With the data communication system according to the third embodiment, as described above, both the data communication and the detection of the data read-in request signal can be performed with the three lines that are the control line 11, the clock line 12 and the data line 13. In addition, it is tolerant of the noise since switching the functions (a function to transmit and receive the data and a function to detect the key data read-in request) of the data line 13 is carried out by the inputting operation of the command data and the inputting operation of the serial data.

Figure 14:
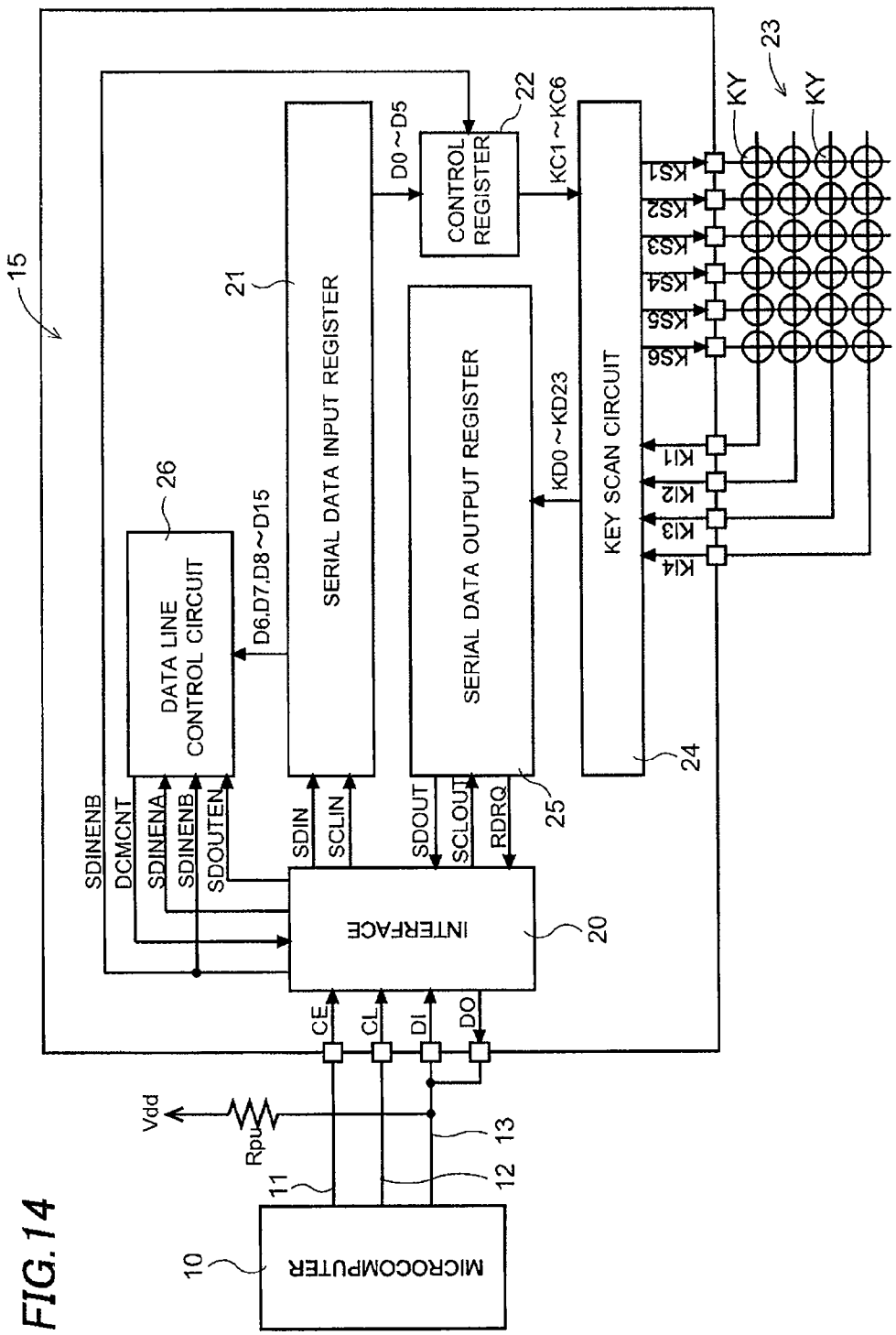
FIG. 14 shows a structure of a data communication system according to a fourth embodiment of this invention between a microcomputer and a key scan IC.

FIG. 14 shows a structure of a data communication system according to a fourth embodiment of this invention between the microcomputer 10 and the key scan IC 15. Differences from the data communication system according to the first embodiment are in that the serial data output enable signal SDOUTEN is inputted to the data line control circuit 26 and in that the serial data D6 and D7 outputted from the serial data input register 21 are inputted to the data line control circuit 26. In other words, the data communication system according to the fourth embodiment is a combination of the data communication system according to the second embodiment and the data communication system according to the third embodiment.

Figure 15:
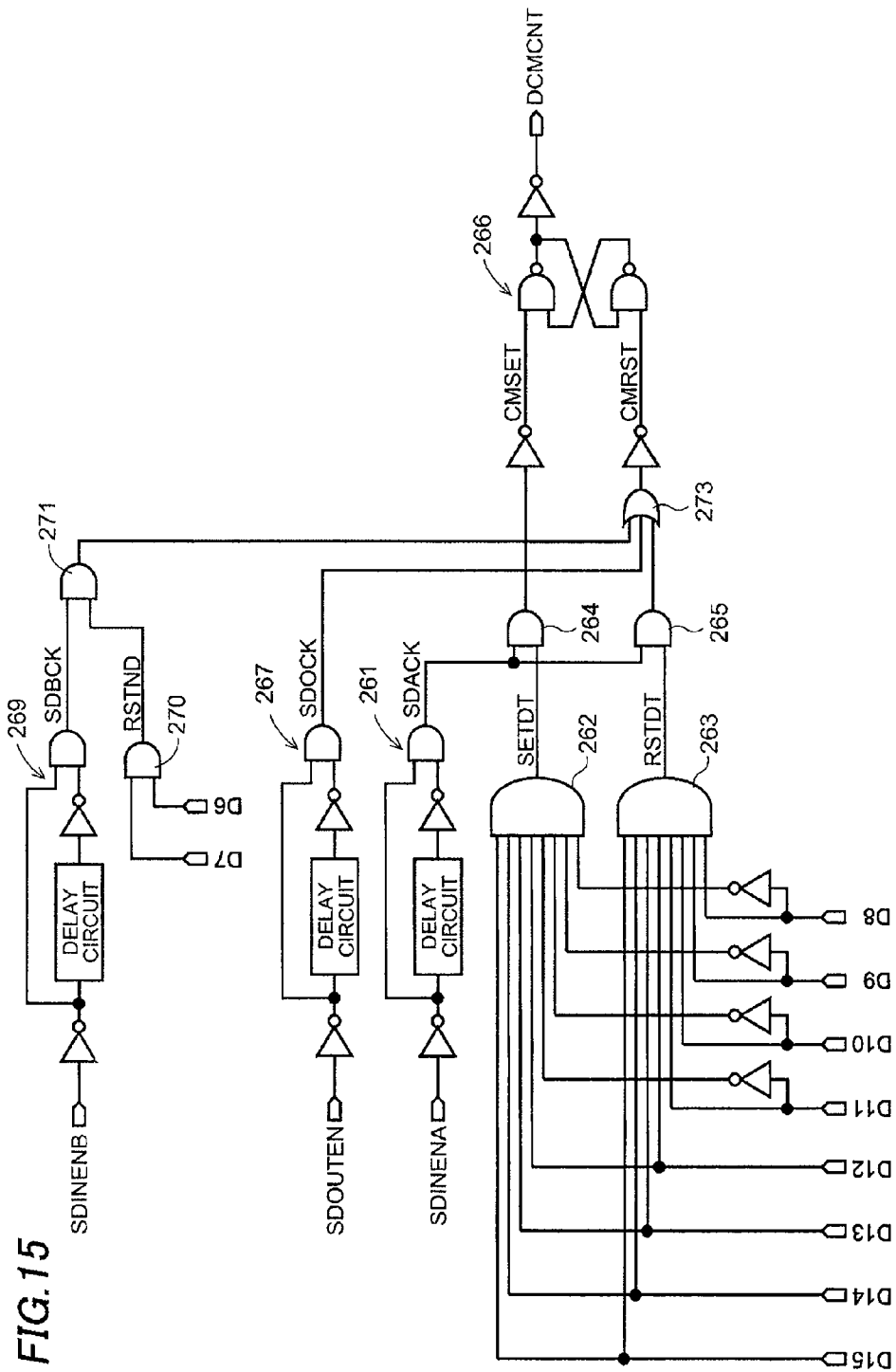
FIG. 15 shows a structure of a data line control circuit in the data communication system according to the fourth embodiment of this invention.
Figure 16D:
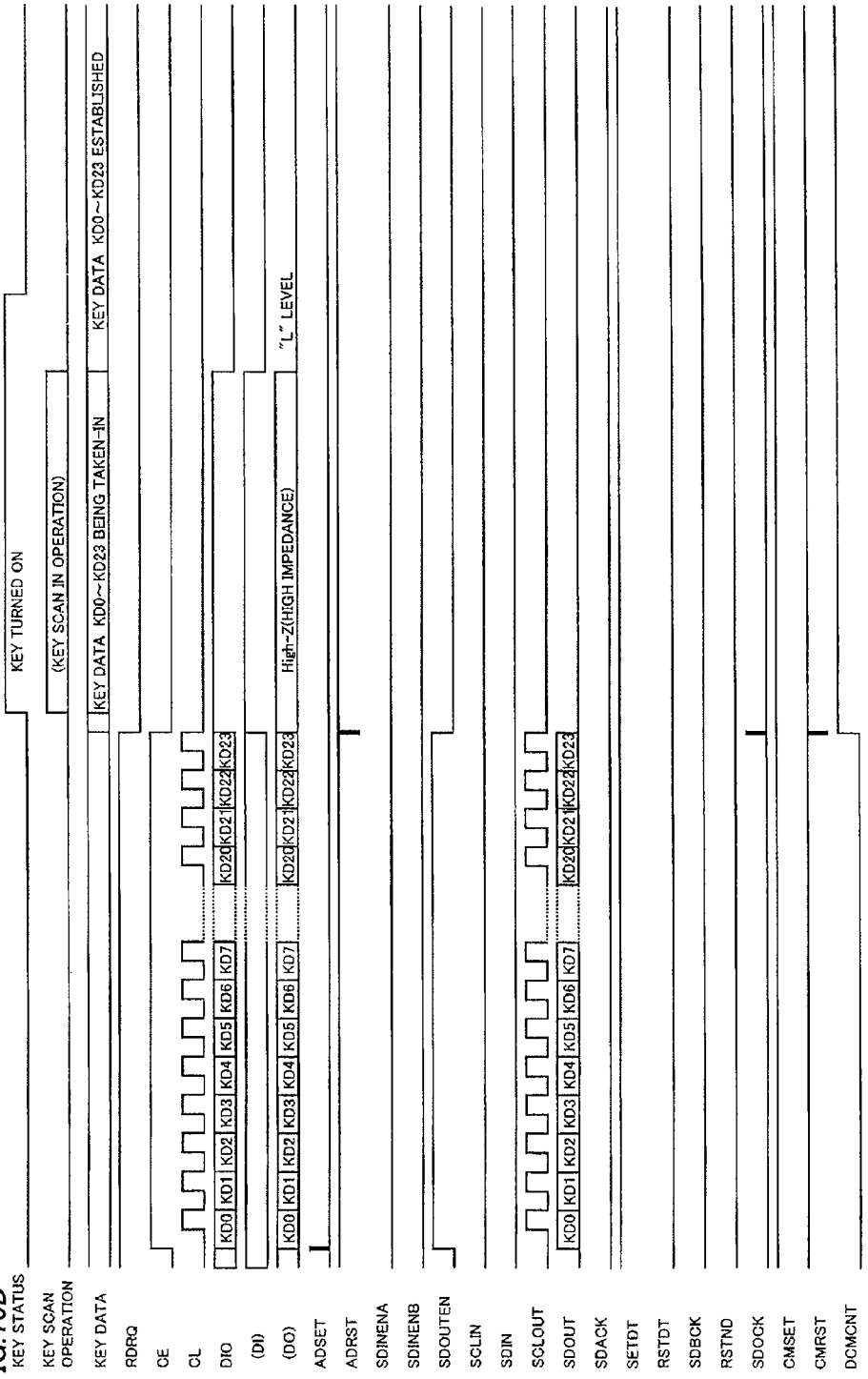

FIG. 15 shows a structure of the data line control circuit 26. The circuit shown in FIG. 15 is a combination of the circuit shown in FIG. 9 and the circuit shown in FIG. 12, and is provided with a NOR circuit 273 to which the output signal of the AND circuit 271, the signal SDOCK and the output signal of the AND circuit 265 are inputted.

That is, while the function of the data line 13 is switched only by the inputting operation of the command data in the first embodiment, the function of the data line 13 is switched to output the data read-in request by resetting the RS flip-flop 266 based on the values of the serial data D6 and D7 to turn the data control signal DCMCNT to the H level when the inputting operation of the serial data is completed in the fourth embodiment. The function of the data line 13 is switched to output the data read-in request by resetting the RS flip-flop 266 to turn the data control signal DCMCNT to the H level also when the outputting operation of the serial data is completed.

FIGS. 16A-16D are timing charts showing operations of the data communication system according to the fourth embodiment of this invention. Explanations are omitted since the operations are a combination of the operations of the data communication system according to the second embodiment and the operations of the data communication system according to the third embodiment.

Figure 17:
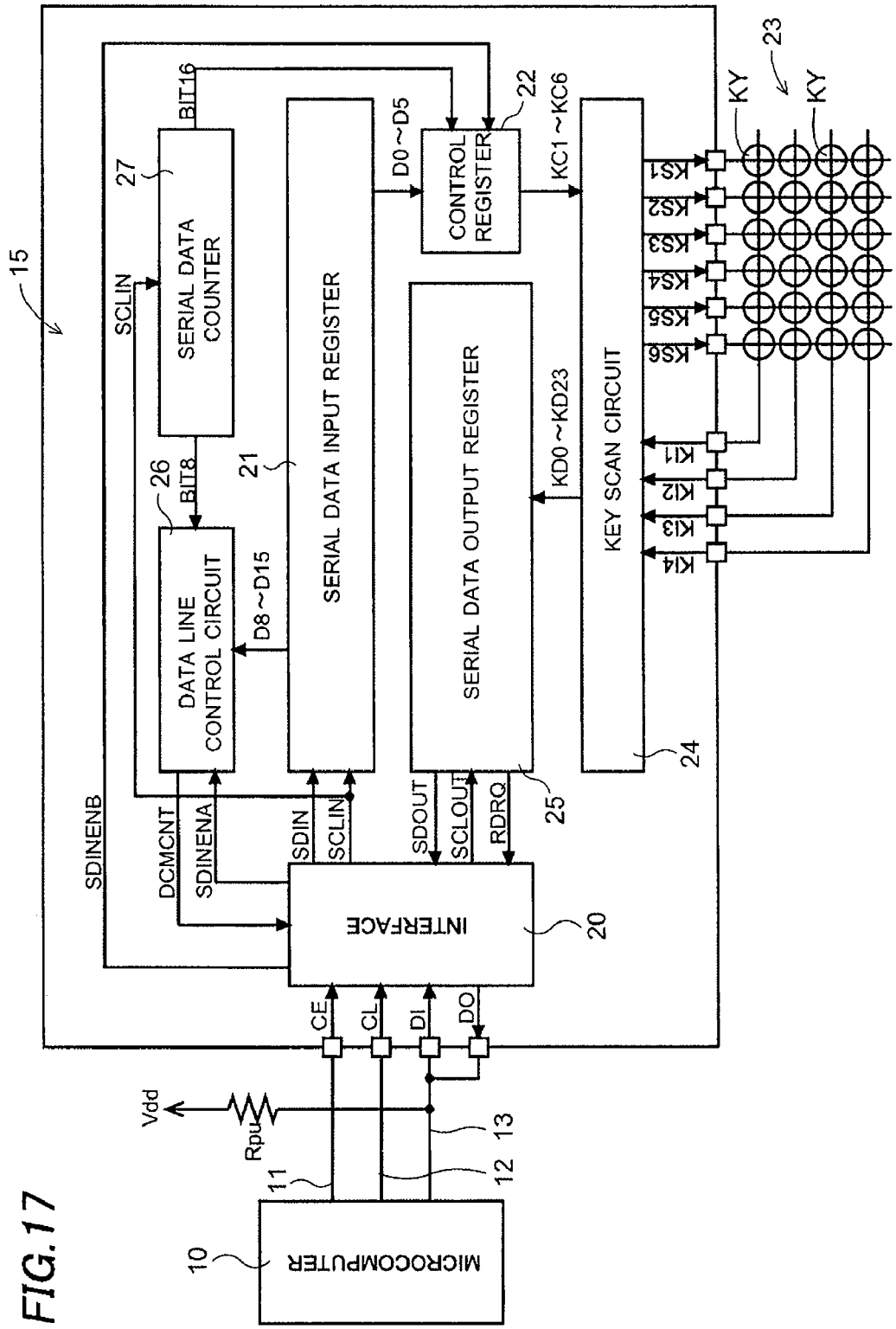
FIG. 17 shows a structure of a data communication system according to a fifth embodiment of this invention between a microcomputer and a key scan IC.

FIG. 17 shows a structure of a data communication system according to a fifth embodiment of this invention between the microcomputer 10 and the key scan IC 15. The data communication system according to the fifth embodiment is formed by adding a serial data counter 27 to the key scan IC 15 (Refer to FIG. 2.) in the data communication system according to the first embodiment. The serial data counter 27 counts the number of bits of the data by counting the number of clocks CL appeared in the signal SCLIN that is inputted to the serial data input register 21.

That is, the numbers of bits of the first command data "00001111" and the second command data "11111111" are counted when they are inputted to the serial data input register 21, and the results are inputted to the data line control circuit 26 to increase accuracy in setting the data line control signal DCMCNT.

Figure 18:
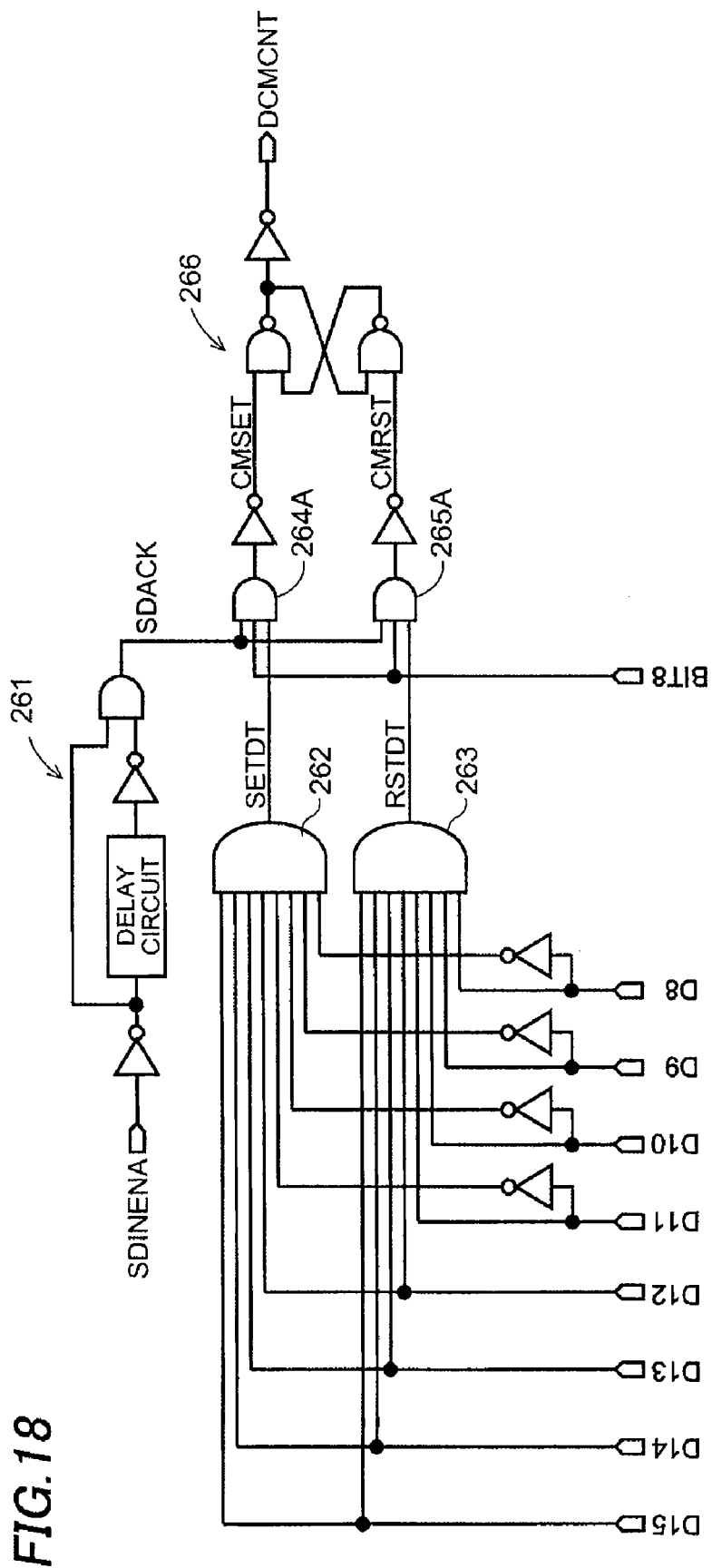
FIG. 18 shows a structure of a data line control circuit in the data communication system according to the fifth embodiment of this invention.

A structure of the data line control circuit 26 is shown in FIG. 18. Similar to the circuit (Refer to FIG. 6.) in the data communication system according to the first embodiment, the set signal SETDT and the signal SDACK are inputted to an AND circuit 264A while the reset signal RSTDT and the signal SDACK are inputted to an AND circuit 265A. An output signal BIT8 of the serial data counter 27 is also inputted to each of the AND circuits 264A and 265A, respectively. When the number of bits counted by the serial data counter 27 reaches eight, the output signal BIT8 turns to the H level to activate the AND circuits 264A and 265A, enabling set/reset operation of the RS flip-flop 266. When the number of bits counted by the serial data counter 27 does not reach eight, on the other hand, the output signal BIT8 is at the L level and the data line control circuit 26 is disabled.

Figure 19:
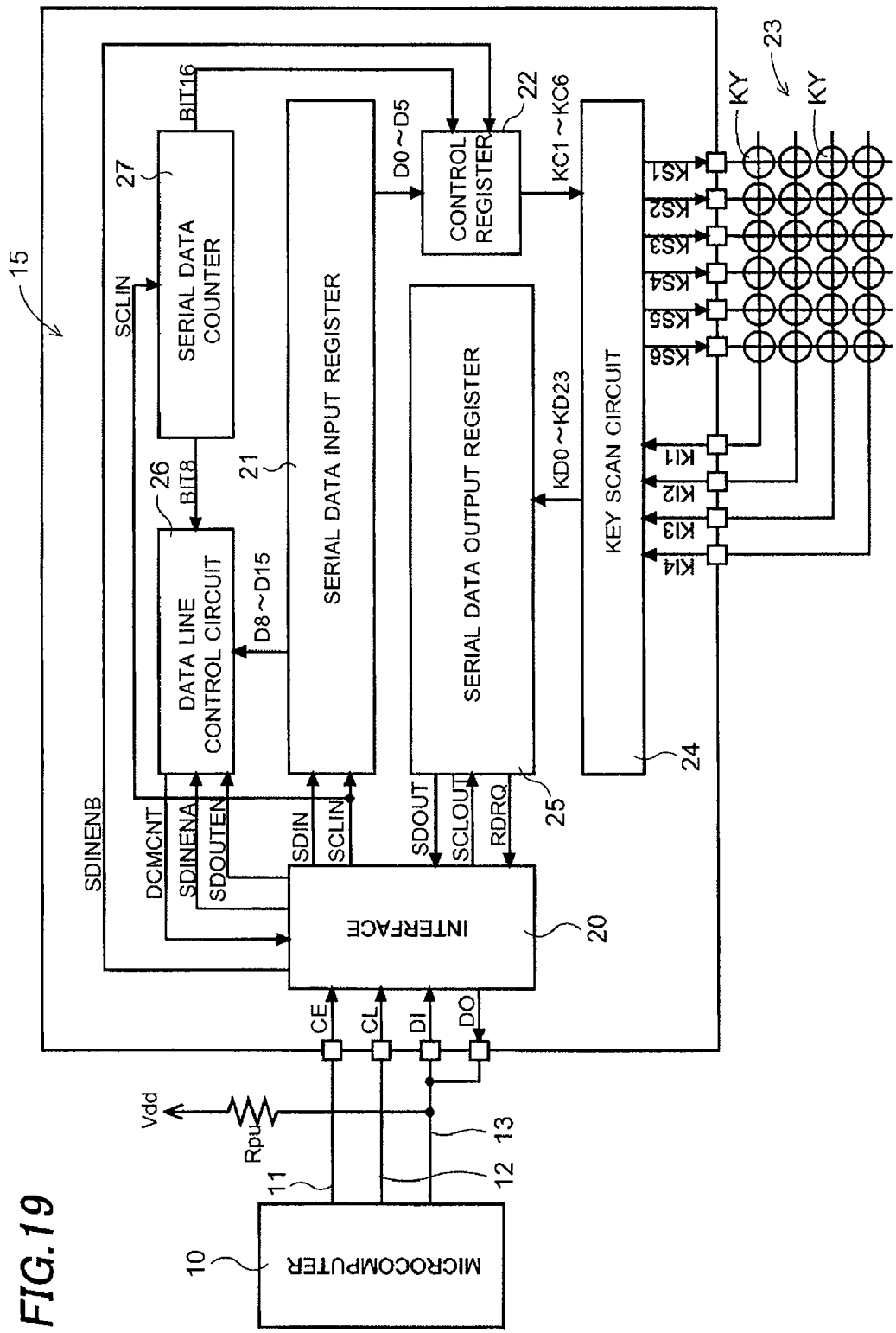
FIG. 19 shows a structure of a data communication system according to a sixth embodiment of this invention between a microcomputer and a key scan IC.

FIG. 19 shows a structure of a data communication system according to a sixth embodiment of this invention between the microcomputer 10 and the key scan IC 15. The data communication system according to the sixth embodiment is formed by adding the serial data counter 27 to the key scan IC 15 (Refer to FIG. 8.) in the data communication system according to the second embodiment. The serial data counter 27 counts the number of bits of the data by counting the number of clocks CL appeared in the signal SCLIN that is inputted to the serial data input register 21. That is, the numbers of bits of the first command data "00001111" and the second command data "11111111" are counted when they are inputted to the serial data input register 21, and the results are inputted to the data line control circuit 26 to increase accuracy in setting the data line control signal DCMCNT.

Figure 20:
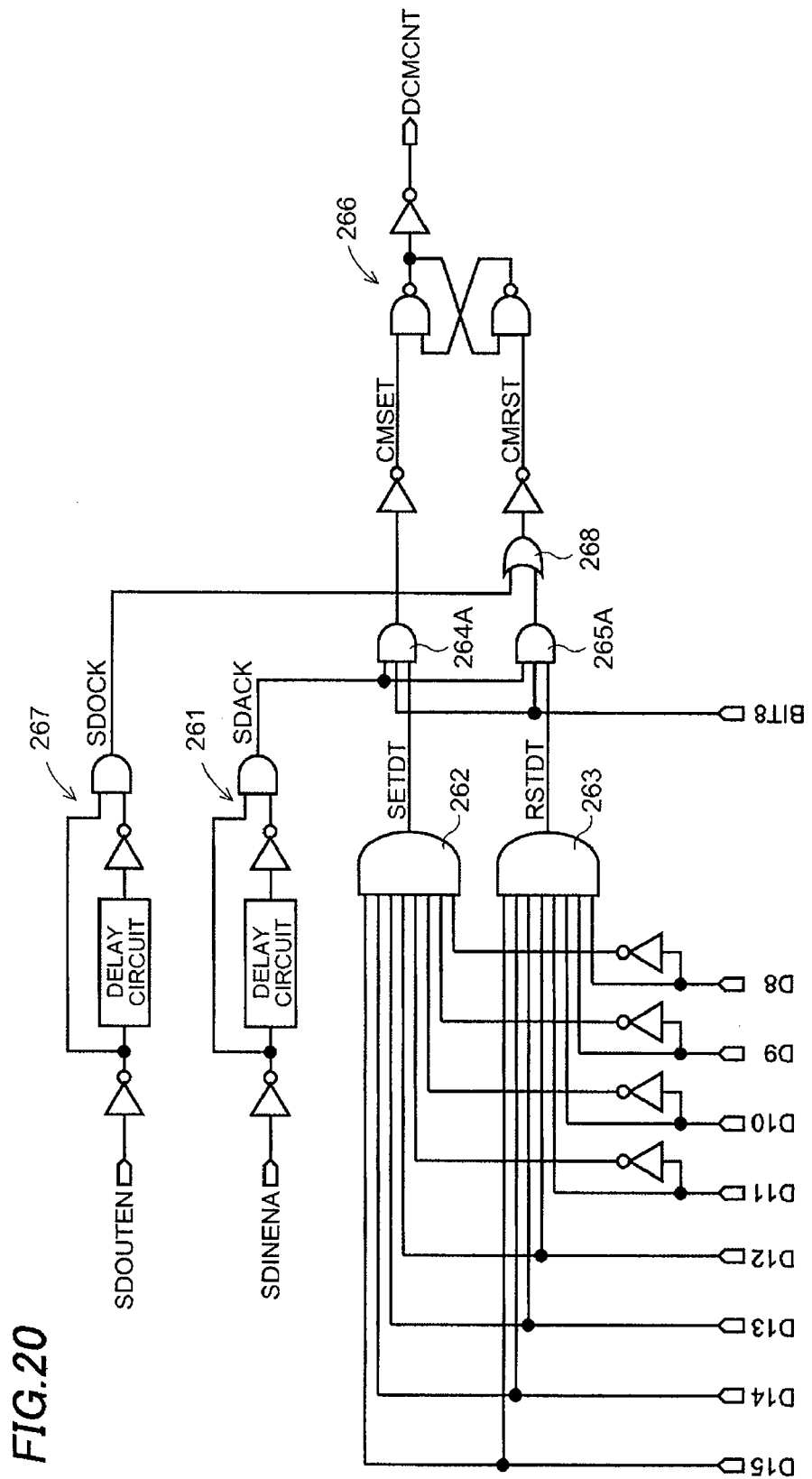
FIG. 20 shows a structure of a data line control circuit in the data communication system according to the sixth embodiment of this invention.

A structure of the data line control circuit 26 is shown in FIG. 20. Similar to the circuit (Refer to FIG. 9.) in the data communication system according to the second embodiment, the set signal SETDT and the signal SDACK are inputted to the AND circuit 264A while the reset signal RSTDT and the signal SDACK are inputted to the AND circuit 265A.

Figure 21:
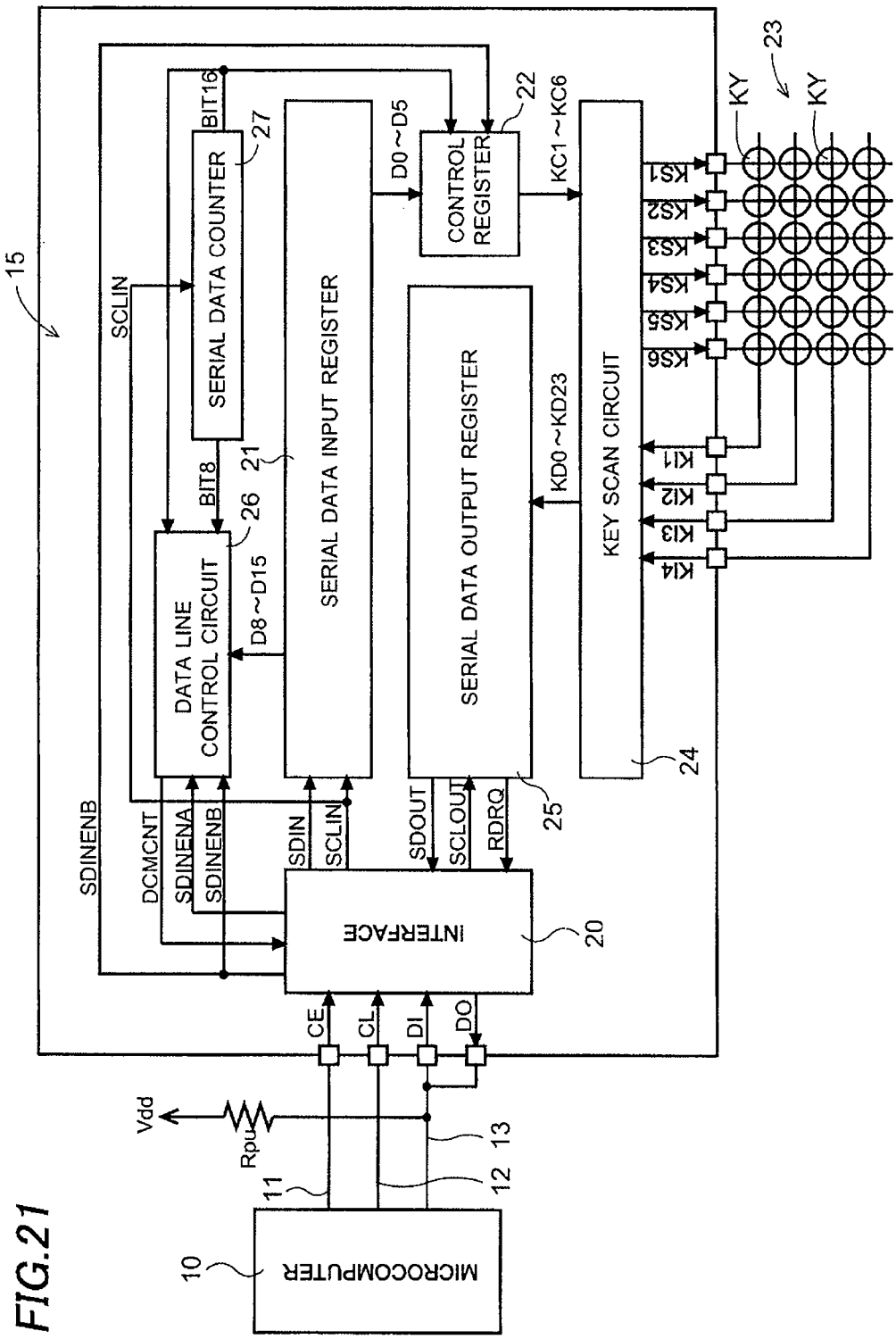
FIG. 21 shows a structure of a data communication system according to a seventh embodiment of this invention between a microcomputer and a key scan IC.

FIG. 21 shows a structure of a data communication system according to a seventh embodiment of this invention between the microcomputer 10 and the key scan IC 15. The data communication system according to the seventh embodiment is formed by adding the serial data counter 27 to the key scan IC 15 (Refer to FIG. 11.) in the data communication system according to the third embodiment. The serial data counter 27 counts the number of bits of the data by counting the number of clocks CL appeared in the signal SCLIN that is inputted to the serial data input register 21. That is, the numbers of bits of the first command data "00001111" and the second command data "11111111" are counted when they are inputted to the serial data input register 21, and the results are inputted to the data line control circuit 26 to increase accuracy in setting the data line control signal DCMCNT.

Figure 22:
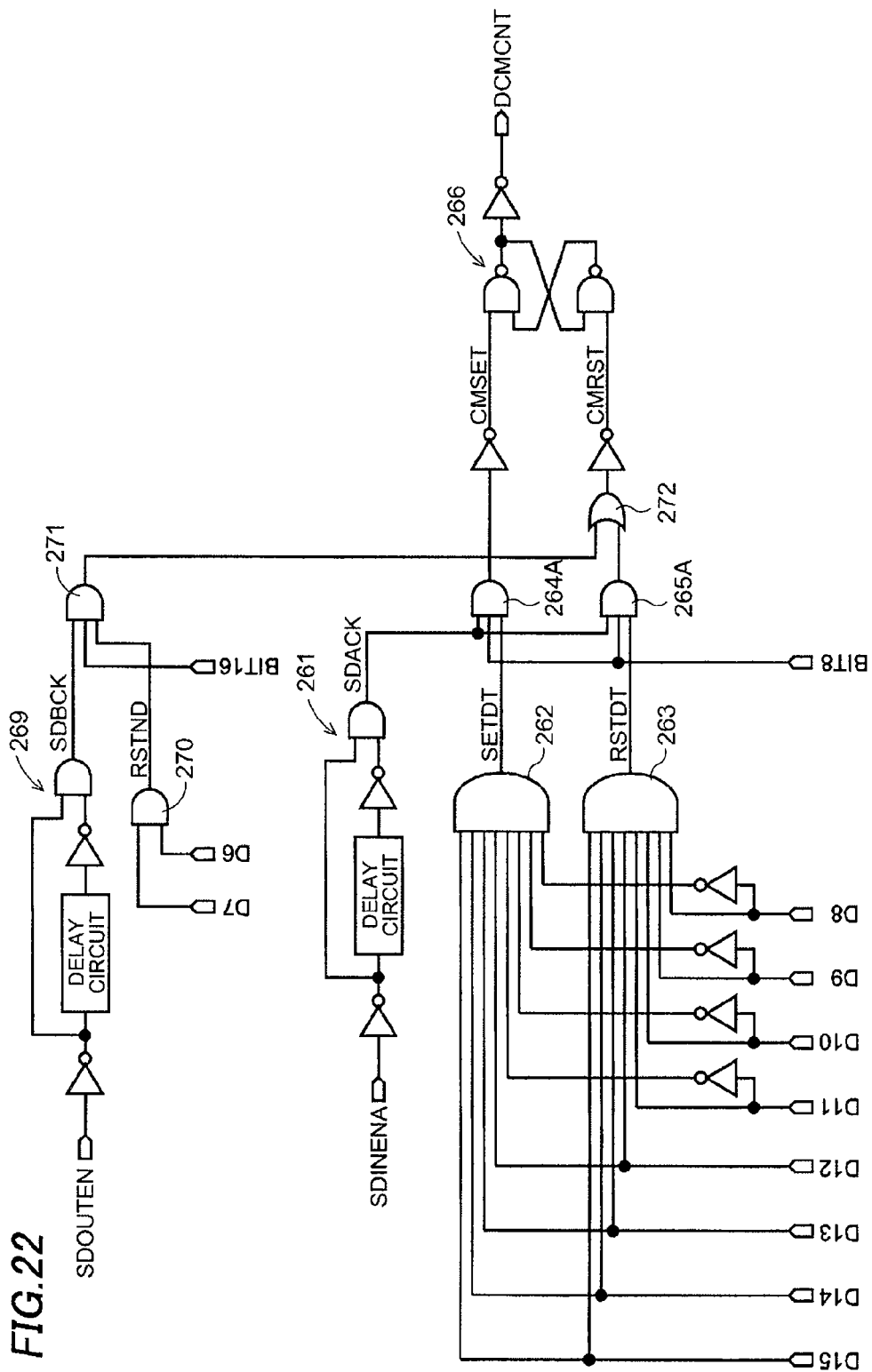
FIG. 22 shows a structure of a data line control circuit in the data communication system according to the seventh embodiment of this invention.

A structure of the data line control circuit 26 is shown in FIG. 22. Similar to the circuit (Refer to FIG. 12.) in the data communication system according to the third embodiment, the set signal SETDT and the signal SDACK are inputted to the AND circuit 264A while the reset signal RSTDT and the signal SDACK are inputted to the AND circuit 265A.

Figure 23:
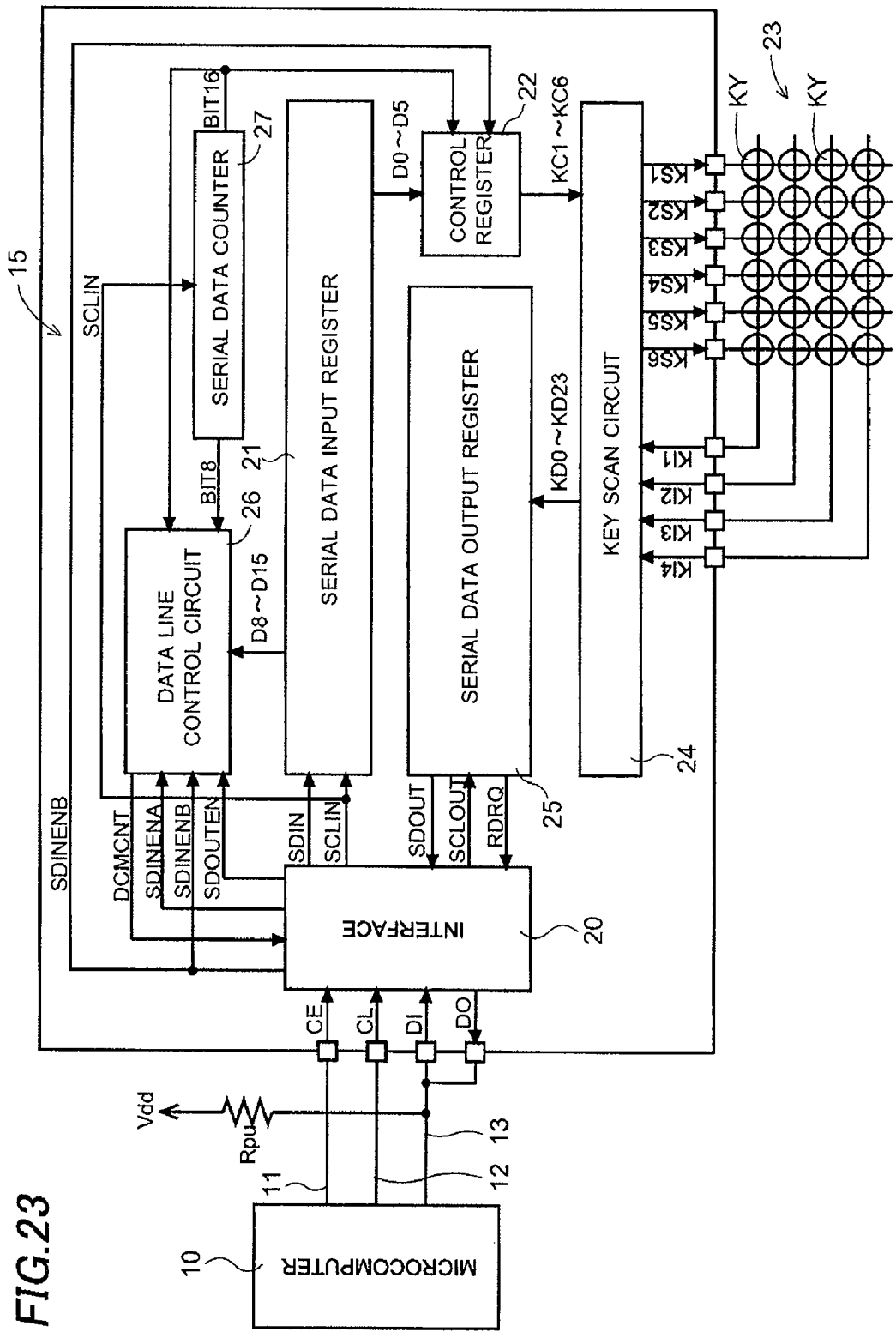
FIG. 23 shows a structure of a data communication system according to an eighth embodiment of this invention between a microcomputer and a key scan IC.

FIG. 23 shows a structure of a data communication system according to an eighth embodiment of this invention between the microcomputer 10 and the key scan IC 15. The data communication system according to the eighth embodiment is formed by adding the serial data counter 27 to the key scan IC 15 (Refer to FIG. 14.) in the data communication system according to the fourth embodiment. The serial data counter 27 counts the number of bits of the data by counting the number of clocks CL appeared in the signal SCLIN that is inputted to the serial data input register 21. That is, the numbers of bits of the first command data "00001111" and the second command data "11111111" are counted when they are inputted to the serial data input register 21, and the results are inputted to the data line control circuit 26 to increase accuracy in setting the data line control signal DCMCNT.

Figure 24:
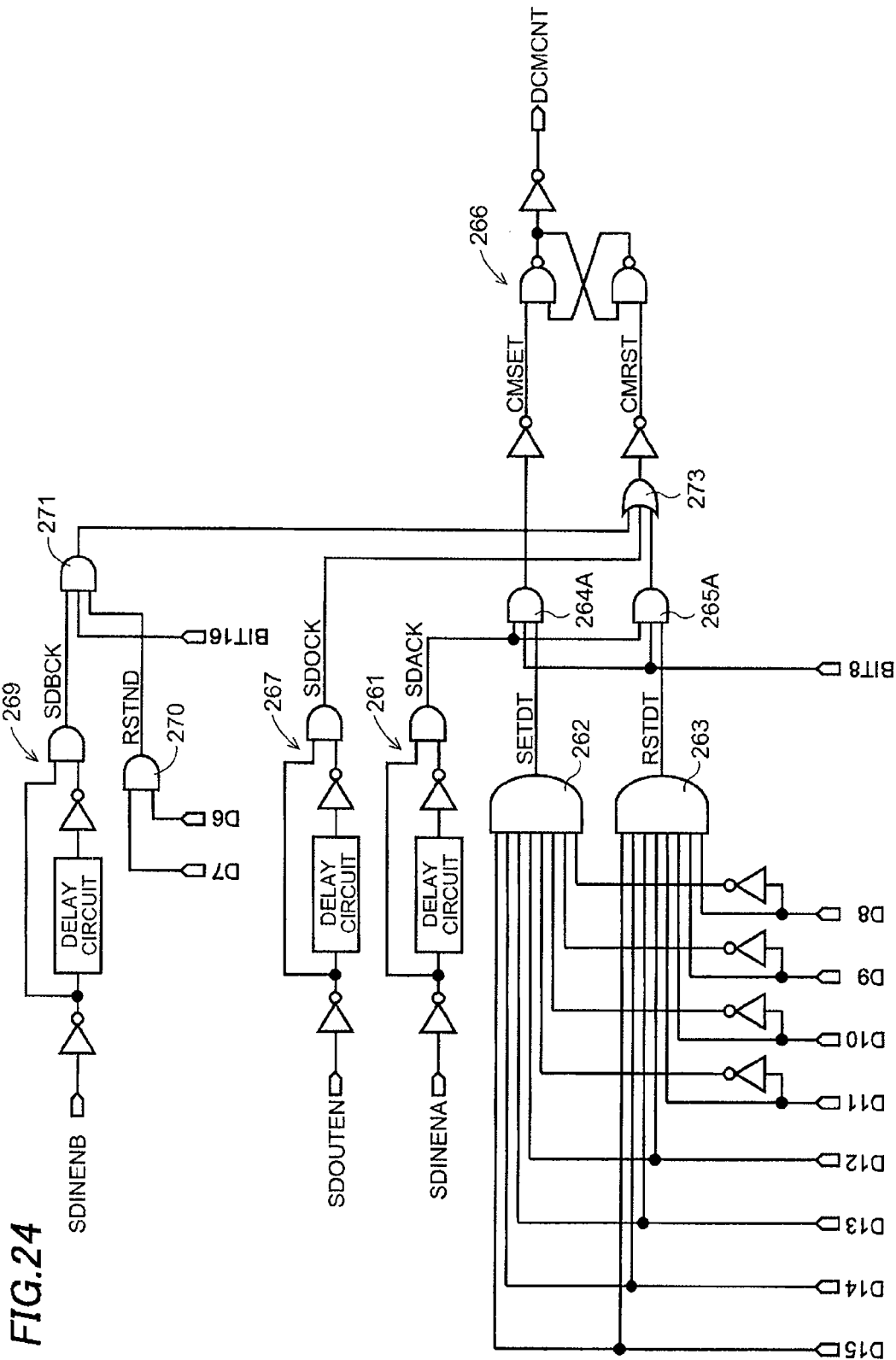
FIG. 24 shows a structure of a data line control circuit in the data communication system according to the eighth embodiment of this invention.

A structure of the data line control circuit 26 is shown in FIG. 24. Similar to the circuit (Refer to FIG. 15.) in the data communication system according to the fourth embodiment, the set signal SETDT and the signal SDACK are inputted to the AND circuit 264A while the reset signal RSTDT and the signal SDACK are inputted to the AND circuit 265A.

Figure 25:
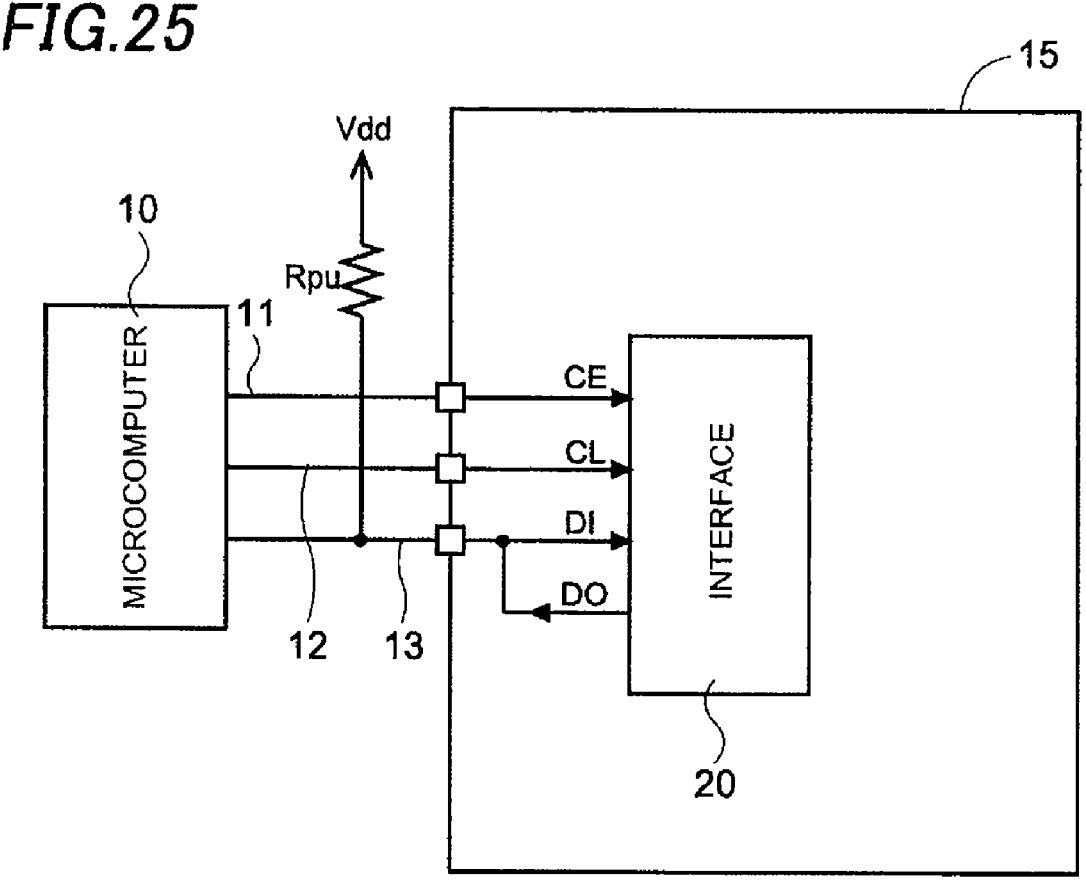
FIG. 25 shows a structure of terminals in a data communication system.
Figure 26:
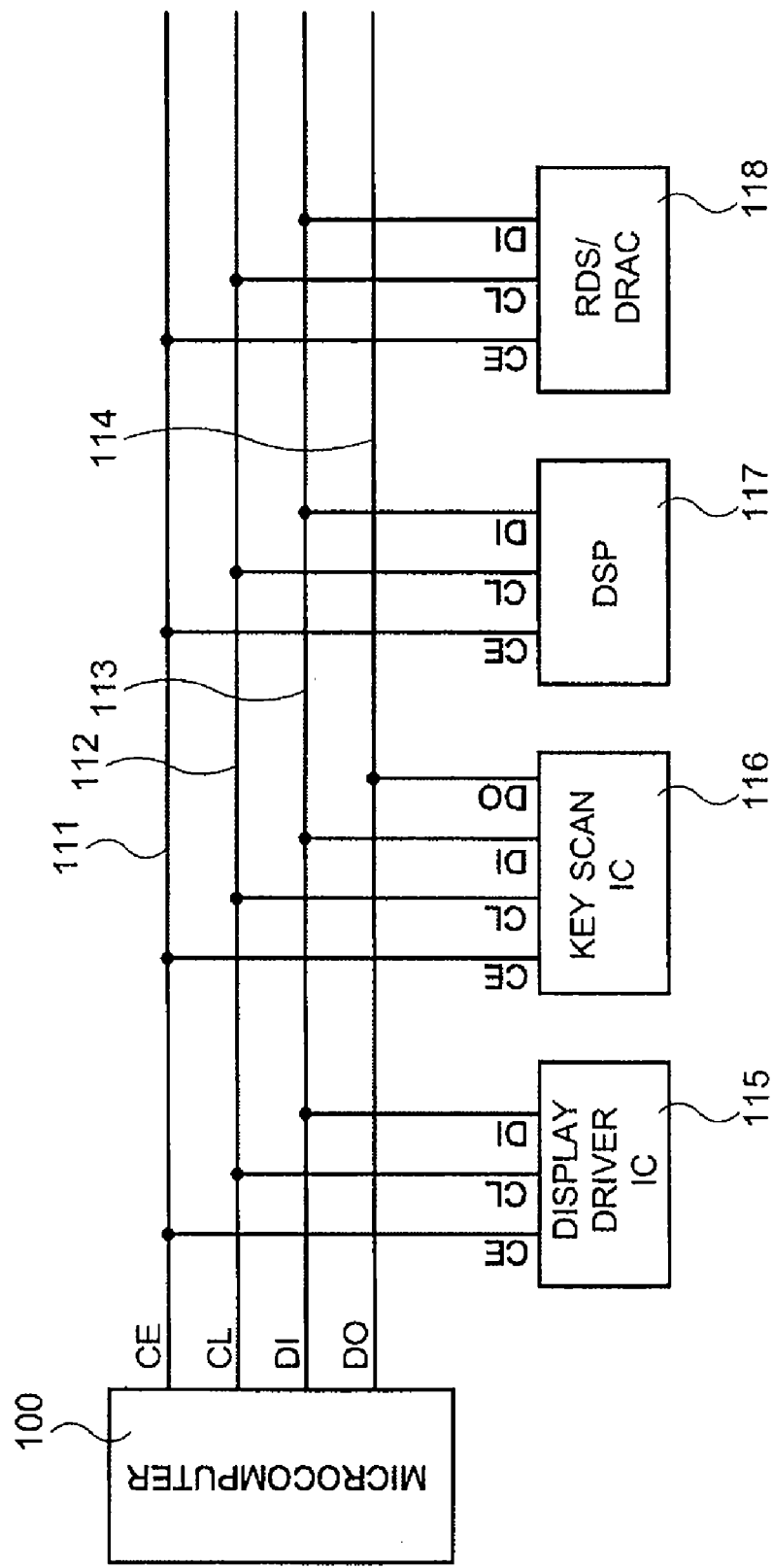
FIG. 26 shows a structure of a conventional data communication system.

Needless to say, this invention is not limited to the embodiments described above and may be modified within the scope of the invention. For example, although the data communication systems according to the first through eighth embodiments are related to the data communication system for the car audio, this invention may be widely applied to other data communication systems between a host and a device using three lines. And although the data communication systems according to the first through eighth embodiments are provided with the terminal DI and the terminal DO as the external terminals of the key scan IC 15, they may be provided with an external terminal DIO that is a combination of the terminal DI and the terminal DO connected together inside the IC (Refer to FIG. 25.).

With the data communication systems according to the embodiments of this invention, both the data communication and the detection of the data read-in request signal can be performed with the three lines that are the control line, the clock line and the data line. In addition, they are tolerant of the noise since switching the functions (the function to transmit and receive the data and the function to detect the key data read-in request) of the data line is carried out by the inputting operation of the command data, by the inputting operation of the command data and the outputting operation of the serial data, or by the inputting operation of the command data and the inputting operation of the serial data.

What is claimed is:

1. A data communication system comprising:
   a host;
   a device;
   a control line connecting the host and the device so as to convey a control signal;
   a clock line connecting the host and the device so as to convey a clock;
   a data line connecting the host and the device so as to convey data, the data line receiving a data read-in request signal from the device and sending the data read-in request signal to the host when the control signal is at a first level, and the data read-in request signal requesting reading-in of the data by the host; and
   a data line control circuit controlling the data line so that outputting of the data read-in request signal to the data line is disabled in response to first command data being inputted from the host to the device through the data line in synchronization with the clock and that the outputting of the data read-in request signal to the data line is enabled in response to second command data being inputted from the host to the device through the data line in synchronization with the clock.

2. The data communication system of claim 1, wherein data communication between the host and the device is performed through the data line while the outputting of the data read-in request signal to the data line is disabled by the data line control circuit.

3. The data communication system of claim 1, wherein a first address is inputted to the device through the data line when the control signal is at the first level, and the first command data is inputted to the device through the data line when the control signal is at a second level.

4. The data communication system of claim 1, wherein a second address is inputted to the device through the data line when the control signal is at the first level, and the second command data is inputted to the device through the data line when the control signal is at a second level.

5. The data communication system of claim 3, wherein the first address is inputted to the device through the data line when the control signal is at the first level, and the second command data is inputted to the device through the data line when the control signal is at the second level.

6. The data communication system of claim 1, further comprising a counter to count numbers of bits of the first command data and the second command data, wherein the data line control circuit controls the data line based on the number of bits counted by the counter.

7. The data communication system of claim 2, wherein a third address is inputted to the device through the data line when the control signal is at the first level, and the data is inputted to the device through the data line when the control signal is at a second level.

8. The data communication system of claim 2, wherein a fourth address is inputted to the device through the data line when the control signal is at the first level, and the data is outputted from the device to the data line when the control signal is at a second level.

9. A data communication system comprising:
   a host;
   a device;
   a control line connecting the host and the device so as to convey a control signal;
   a clock line connecting the host and the device so as to convey a clock;
   a data line connecting the host and the device so as to convey data, the data line receiving a data read-in request signal from the device and sending the data read-in request signal to the host when the control signal is at a first level, and the data read-in request signal requesting reading-in of the data by the host; and
   a data line control circuit controlling the data line so that outputting of the data read-in request signal to the data line is disabled in response to command data being inputted from the host to the device through the data line in synchronization with the clock and that the outputting of the data read-in request signal to the data line is enabled in response to the data being outputted from the device to the data line in synchronization with the clock.

10. The data communication system of claim 9, wherein an address is inputted to the device through the data line when the control signal is at the first level, and the data is outputted from the device to the data line when the control signal is at a second level.

11. The data communication system of claim 9, further comprising a counter to count the number of bits of the command data, wherein the data line control circuit controls the data line based on the number of bits counted by the counter.

12. The data communication system of claim 10, further comprising a counter to count the number of bits of the command data, wherein the data line control circuit controls the data line based on the number of bits counted by the counter.

13. A data communication system comprising:
   a host;
   a device;
   a control line connecting the host and the device so as to convey a control signal;
   a clock line connecting the host and the device so as to convey a clock;
   a data line connecting the host and the device so as to convey data, the data line receiving a data read-in request signal from the device and sending the data read-in request signal to the host when the control signal is at a first level, and the data read-in request signal requesting reading-in of the data by the host; and
   a data line control circuit controlling the data line so that outputting of the data read-in request signal to the data line is disabled in response to command data from the host being inputted to the device through the data line in synchronization with the clock and that the outputting of the data read-in request signal to the data line is enabled in response to the data being inputted from the host to the device through the data line in synchronization with the clock.

14. The data communication system of claim 13, wherein the data line control circuit controls the data line so that the outputting of the data read-in request signal is enabled when the data inputted from the host to the device is of a predetermined value.

15. The data communication system of claim 13, wherein an address is inputted to the device through the data line when the control signal is at the first level, and the data is inputted to the device through the data line when the control signal is at a second level.

16. The data communication system of claim 14, wherein an address is inputted to the device through the data line when the control signal is at the first level, and the data is inputted to the device through the data line when the control signal is at a second level.

17. The data communication system of claim 13, further comprising a counter to count the number of bits of the command data, wherein the data line control circuit controls the data line based on the number of bits counted by the counter.

18. The data communication system of claim 14, further comprising a counter to count the number of bits of the command data, wherein the data line control circuit controls the data line based on the number of bits counted by the counter.

19. The data communication system of claim 15, further comprising a counter to count the number of bits of the command data, wherein the data line control circuit controls the data line based on the number of bits counted by the counter.

20. The data communication system of claim 16, further comprising a counter to count the number of bits of the command data, wherein the data line control circuit controls the data line based on the number of bits counted by the counter.

* * * * *